US011879809B2

(12) United States Patent
Kamikura et al.

(10) Patent No.: US 11,879,809 B2
(45) Date of Patent: Jan. 23, 2024

(54) VEHICLE ACTION SIMULATION METHOD AND VEHICLE ACTION SIMULATION SYSTEM

(71) Applicant: BRIDGESTONE CORPORATION, Tokyo (JP)

(72) Inventors: Takahisa Kamikura, Tokyo (JP); Hiroshi Kato, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 252 days.

(21) Appl. No.: 17/298,994

(22) PCT Filed: Jul. 10, 2019

(86) PCT No.: PCT/JP2019/027320
§ 371 (c)(1),
(2) Date: Jun. 2, 2021

(87) PCT Pub. No.: WO2020/121575
PCT Pub. Date: Jun. 18, 2020

(65) Prior Publication Data
US 2022/0065753 A1    Mar. 3, 2022

(30) Foreign Application Priority Data
Dec. 10, 2018   (JP) ................................. 2018-230906

(51) Int. Cl.
*G01M 17/007*   (2006.01)
(52) U.S. Cl.
CPC ................. *G01M 17/0074* (2013.01)
(58) Field of Classification Search
CPC ........... G01M 17/022; G01M 17/0074; G01M 17/0072; G01M 17/045; G01M 17/065
See application file for complete search history.

(56) References Cited

U.S. PATENT DOCUMENTS

2009/0095064 A1    4/2009  Imanishi et al.
2015/0135812 A1*   5/2015  Kuwayama ......... G01M 17/022
                                                      73/146
(Continued)

FOREIGN PATENT DOCUMENTS

CN      101421604 A     4/2009
CN      105209879 A    12/2015
(Continued)

OTHER PUBLICATIONS

Chinese Office Action dated Mar. 3, 2023 in Chinese Application No. 2019800812217.

(Continued)

*Primary Examiner* — Eric S. McCall
*Assistant Examiner* — Timothy P Graves
(74) *Attorney, Agent, or Firm* — Sughrue Mion, PLLC

(57) ABSTRACT

In a vehicle action simulation method according to the present invention, a behavior of an actual vehicle during travel is predicted, and an attitude of a tire and a rotational speed of a rotary drum are changed to reproduce a transient change in a tire attitude that occurs during the travel of the actual vehicle on the tire while the predicted behavior of the actual vehicle during travel is reflected, stress applied to the tire in contact with the rotary drum of a tire ground contact characteristic measuring portion is measured, tire ground contact characteristics are calculated, the behavior of the actual vehicle during travel is predicted while vehicle characteristics predicted from the tire ground contact characteristics are reflected, and the prediction, the reproduction, the measurement of stress, and the calculation are performed in parallel.

20 Claims, 12 Drawing Sheets

(56) References Cited

U.S. PATENT DOCUMENTS

2016/0061681 A1 3/2016 Jang
2018/0328818 A1 11/2018 Smith et al.

FOREIGN PATENT DOCUMENTS

| EP | 1 422 508 A1 | 5/2004 |
| EP | 3 892 978 A1 | 10/2021 |
| JP | 2003-175710 A | 6/2003 |
| JP | 2006-226778 A | 8/2006 |
| JP | 2007-172194 A | 7/2007 |
| JP | 2008-122253 A | 5/2008 |
| JP | 2010-529420 A | 8/2010 |
| JP | 2011-203207 A | 10/2011 |
| JP | 2014-021012 A | 2/2014 |
| JP | 2015-040762 A | 3/2015 |
| JP | 2015040762 A * | 3/2015 |
| JP | 2018-146421 A | 9/2018 |
| WO | 2008/137366 A1 | 11/2008 |
| WO | 2011/118667 A1 | 9/2011 |

OTHER PUBLICATIONS

Extended European Search Report dated Jul. 29, 2022 in European Application No. 19894963.8.
International search report for PCT/JP2019/027320 dated Sep. 17, 2019.

* cited by examiner

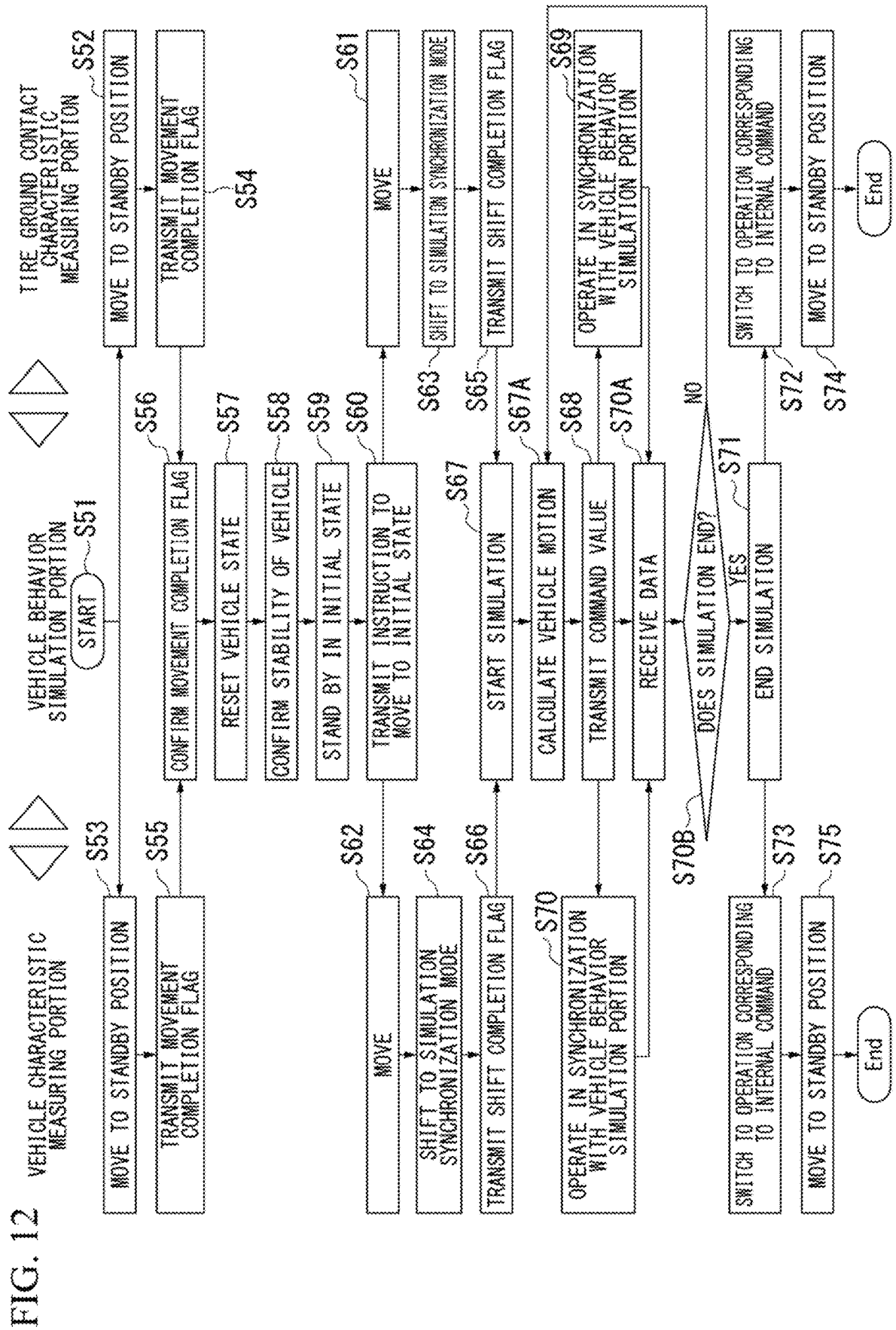

VEHICLE ACTION SIMULATION METHOD AND VEHICLE ACTION SIMULATION SYSTEM

CROSS-REFERENCE TO RELATED APPLICATIONS

This application is a National Stage of International Application No. PCT/JP2019/027320 filed Jul. 10, 2019, which claims priority under U.S.C. § 119(a) to Japanese Patent Application No. JP2018-230906 filed on Dec. 10, 2018.

TECHNICAL FIELD

The present invention relates to a vehicle action simulation method and a vehicle action simulation system.

Priority is claimed on Japanese Patent Application No. 2018-230906, filed on Dec. 10, 2018, the content of which is incorporated herein by reference.

BACKGROUND ART

Patent Document 1 discloses a method of measuring ground contact pressure characteristics of a tire through which ground contact characteristics of a tire at various camber angles and various slip angles are obtained. In the technique disclosed in Patent Document 1, a tire to which a camber angle and a slip angle are given is in contact with a rotary drum in which a measuring portion is embedded, both the tire and the rotary drum are rotated, and the ground contact pressure, shear stress in a width direction, and shear stress in a circumferential direction of the tire are simultaneously measured while the tire is displaced in the direction of an axis of rotation of the rotary drum.

In the technique disclosed in Patent Document 1, the ground contact characteristics of the tire are obtained but transient conditions of the tire, such as a camber angle, a slip angle, and ground contact pressure, are not reproduced, nor is the behavior of an actual vehicle on which the tires are mounted predicted. For this reason, the behavior of the actual vehicle on which the tires are mounted during travel cannot be simulated with high accuracy with the technique disclosed in Patent Document 1.

Patent Document 2 discloses a development support device that supports the development of a travel control unit of a vehicle. In the technique disclosed in Patent Document 2, the development support device for the travel control unit includes a travel control unit where an electrical system, an electronic system, and a mechanical system used in a stable travel system of a vehicle are integrated, a digital calculator that includes numerical simulation means for numerically simulating a vehicle motion, and a tire vibrating device that vibrates the tires of the vehicle. The tire vibrating device includes a rotary drum and a tire that is in contact with the rotary drum and is held by a tire drive mechanism.

In the technique disclosed in Patent Document 2, the circumferential speed of the rotary drum, the circumferential speed of the tire, a load, an attitude, and the like are measured but tire ground contact characteristics (a grip force distribution, a shear stress distribution in a width direction, and a shear stress distribution in a circumferential direction) are not measured. Further, in the technique disclosed in Patent Document 2, a vehicle motion is simulated but tire ground contact characteristics are not reflected in the simulation of a vehicle motion. For this reason, the behavior of the actual vehicle on which the tires are mounted during travel cannot be simulated with high accuracy with the technique disclosed in Patent Document 2.

Patent Document 3 discloses a hardware-in-the-loop simulation (HILS) device that is used to evaluate the motion performance of a vehicle. In the technique disclosed in Patent Document 3, the HILS device includes support parts on which a vehicle is to be placed and which independently displace a vehicle body and each wheel, a mount portion that includes a measuring instrument for measuring the displacement and/or acting forces of the vehicle body and each wheel, and a controller that controls the displacement of each of the support parts for the vehicle body and each wheel.

In the technique disclosed in Patent Document 3, the displacement and/or acting forces of the vehicle body and each wheel are measured but tire ground contact characteristics are not measured. Further, the behavior of an actual vehicle on which the tires are mounted is not predicted, either. For this reason, the behavior of the actual vehicle on which the tires are mounted during travel cannot be simulated with high accuracy with the technique disclosed in Patent Document 3.

CITATION LIST

Patent Document

[Patent Document 1]
Japanese Unexamined Patent Application, First Publication No. 2011-203207
[Patent Document 2]
Japanese Unexamined Patent Application, First Publication No. 2007-172194
[Patent Document 3]
Japanese Unexamined Patent Application, First Publication No. 2015-040762

SUMMARY OF INVENTION

Technical Problem

The present invention has been made in consideration of the above-mentioned circumstances, and an object of the present invention is to provide a vehicle action simulation method and a vehicle action simulation system that can simulate the behavior of an actual vehicle on which tires are mounted during travel with high accuracy.

Solution to Problem

A vehicle action simulation method according to an aspect of the present invention includes: a prediction step of causing a vehicle behavior simulation portion to predict a behavior of an actual vehicle during travel on the basis of input information; a reproduction step of causing a tire ground contact characteristic measuring portion to change an attitude of a tire and a rotational speed of a rotary drum to reproduce a transient change in a tire attitude that occurs during the travel of the actual vehicle on the tire while reflecting the behavior of the actual vehicle during travel predicted in the prediction step; a stress measurement step of causing a stress measuring portion embedded on the rotatable rotary drum of the tire ground contact characteristic measuring portion to measure stress that is applied to the tire in contact with the rotary drum that is rotationally driven; and a calculation step of causing the tire ground contact characteristic measuring portion to calculate tire ground contact characteristics on the basis of the stress measured by the stress measuring portion. The tire ground contact characteristics calculated in the calculation step correspond to a tire attitude at each point in time during a period where the transient change occurs; the vehicle behavior simulation portion performs the prediction step while reflecting vehicle characteristics predicted from the tire ground contact characteristics calculated in the calculation step; and the prediction step performed by the vehicle behavior simulation portion, and the reproduction step, the stress measurement step, and the calculation step performed by the tire ground contact characteristic measuring portion are performed in parallel.

Advantageous Effects of Invention

According to the present invention, it is possible to provide a vehicle action simulation method and a vehicle action simulation system that can simulate the behavior of an actual vehicle on which tires are mounted during travel with high accuracy.

BRIEF DESCRIPTION OF DRAWINGS

FIG. 3 is a diagram showing a ground contact region of a tread surface of the tire that is in contact with a rotary drum, and the like.

FIG. 5 is a diagram showing an example of a transient change in a tire attitude occurring during the travel of an actual vehicle that is reproduced on the tire by the tire ground contact characteristic measuring portion, and the like.

FIG. 12 is a sequence diagram showing the details of processing performed in the vehicle action simulation system according to the present invention.

DESCRIPTION OF EMBODIMENTS

Embodiments of a vehicle action simulation method and a vehicle action simulation system according to the present invention will be described below with reference to the drawings.

Figure 1:
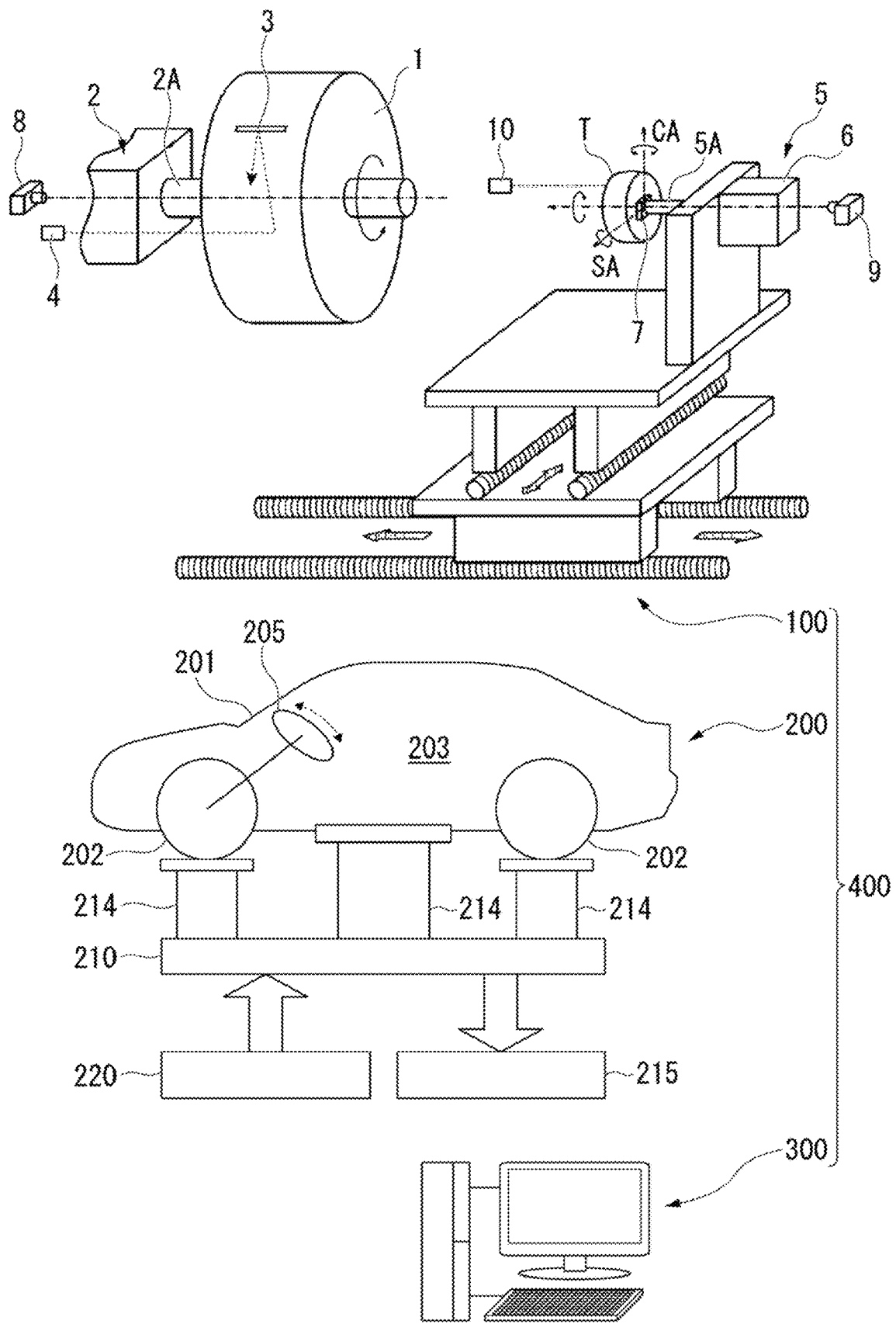
FIG. 1 is a diagram showing the configuration of an example of a vehicle action simulation system according to the present invention.
Figure 2:
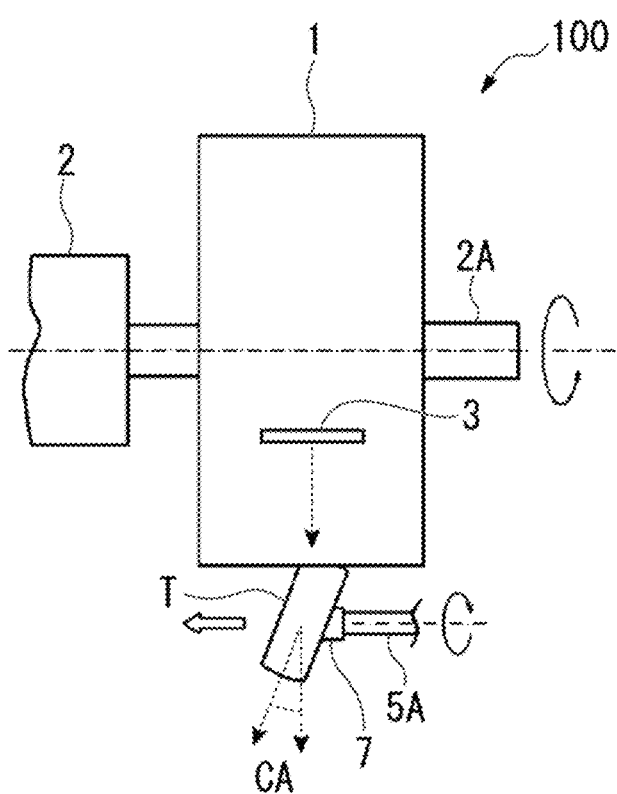
FIG. 2 is a diagram showing a camber angle and the like to be given to a tire.
Figure 3:
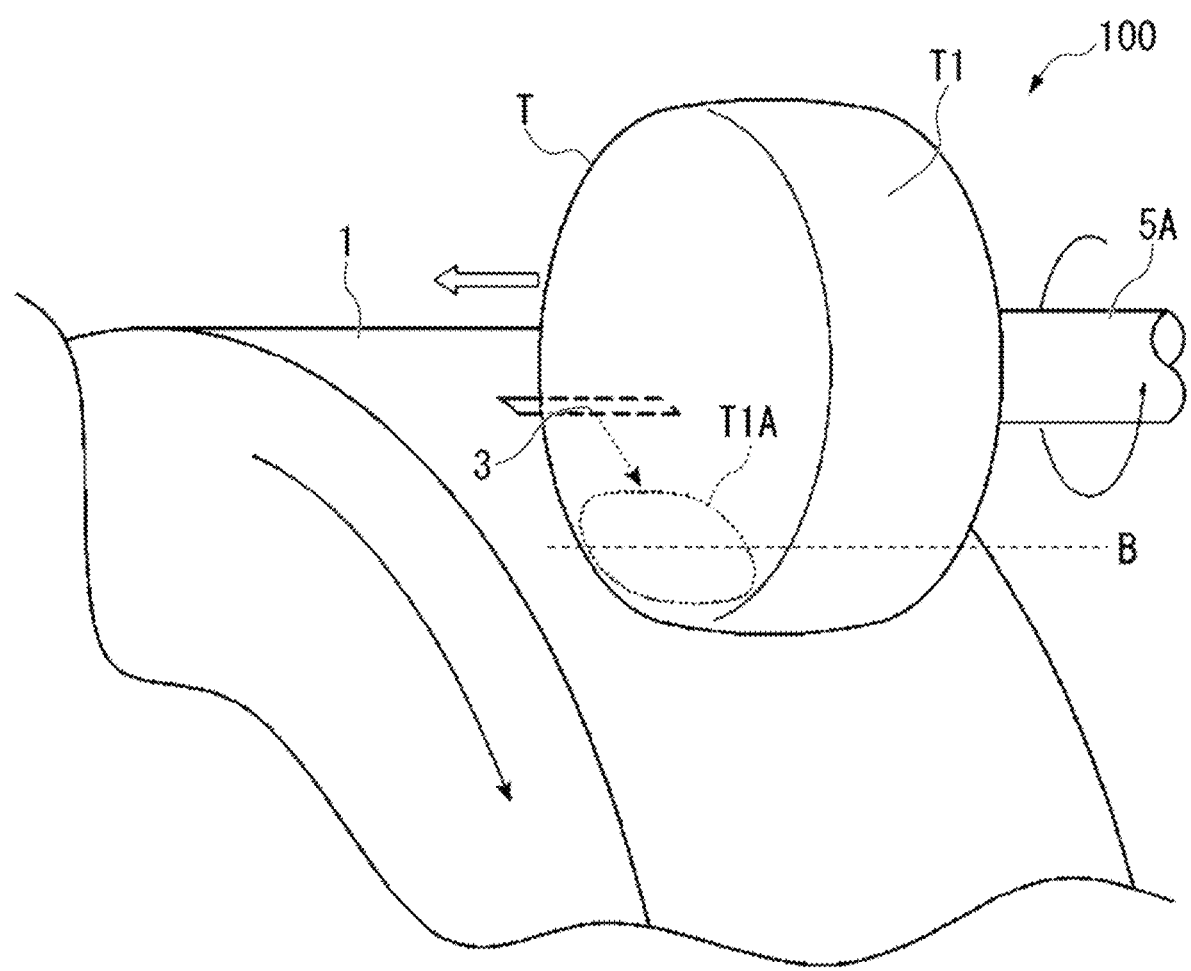

FIG. 1 is a diagram showing the configuration of an example of a vehicle action simulation system 400 according to the present invention. FIG. 2 is a diagram showing a camber angle CA and the like to be given to a tire T. FIG. 3 is a diagram showing a ground contact region T1A of a tread surface T1 of the tire T that is in contact with a rotary drum 1, and the like.

In the example shown in FIGS. 1 to 3, the vehicle action simulation system 400 includes a tire ground contact characteristic measuring portion 100, a vehicle characteristic measuring portion 200, and a vehicle behavior simulation portion 300.

In another example, the vehicle action simulation system 400 may not include the vehicle characteristic measuring portion 200.

In the example shown in FIGS. 1 to 3, the tire ground contact characteristic measuring portion 100 measures the ground contact characteristics of the tire T. The tire ground contact characteristic measuring portion 100 includes the rotary drum 1, a drum driving portion 2, a stress measuring portion 3, a processing portion 4, a tire position control portion 5, a tire driving portion 6, and a tire angle control portion 7, and further may include a drum-side rotational position detecting portion 8, a tire-side rotational position detecting portion 9, and a tire air pressure changing portion 10.

The rotary drum 1 is a substantially cylindrical drum that is adapted to be rotatable. As shown in FIGS. 2 and 3, the tread surface T1 of the tire T is in contact with the outer peripheral surface of the rotary drum 1.

The drum driving portion 2 is, for example, a motor or the like that rotationally drives the rotary drum 1. The drum driving portion 2 includes a drum shaft 2A. The drum shaft 2A is connected to the rotary drum 1. The drum driving portion 2 can rotationally drive the rotary drum 1 in both a normal direction and a reverse direction, and can adjust the rotational speed of the rotary drum 1.

The rotary drum 1 is a type of outside drum in the example shown in FIGS. 1 to 3, but the rotary drum 1 may be a type of inside drum in other examples.

In the example shown in FIGS. 1 to 3, the stress measuring portion 3 is embedded on the rotary drum 1 and measures stress (tire force) applied to the tire T that is in contact with the rotary drum 1. For example, a three-component force sensor, which can measure a grip force, shear stress in a width direction, and shear stress in a circumferential direction applied to the tire T, can be used as the stress measuring portion 3.

The stress measuring portion 3 is a three-component force sensor in the example shown in FIGS. 1 to 3. However, in other examples, the stress measuring portion 3 may be a combination of a sensor that measures a grip force and a two-axis sensor that measures shear stress in the width direction and shear stress in the circumferential direction.

In the example shown in FIGS. 1 to 3, the processing portion 4 calculates tire ground contact characteristics, which are the characteristics of the ground contact region T1A (see FIG. 3) of the tread surface T1 of the tire T in contact with the rotary drum 1, on the basis of the stress measured by the stress measuring portion 3.

The processing portion 4 is, for example, a microcomputer that includes a central processing portion (CPU), a memory, and the like. A data analysis program, which is used to analyze measurement results, is stored in the memory of the processing portion 4. For example, a general-purpose numerical analysis program is used as the data analysis program.

The processing portion 4 can visualize a calculated grip force distribution, a calculated shear stress distribution in the width direction, a calculated shear stress distribution in the circumferential direction, and the like in the ground contact region T1A to display the calculated distributions and the like on a monitor (not shown).

The processing portion 4 is provided with the above-mentioned data analysis program in the example shown in FIGS. 1 to 3, but the processing portion 4 may be provided with a data analysis program different from the above-mentioned data analysis program in other examples.

In the example shown in FIGS. 1 to 3, the tire position control portion 5 controls the position of the tire T with respect to the rotary drum 1. In detail, the tire position control portion 5 can adjust the position of the tire T with respect to the rotary drum 1 in the direction of the axis of rotation and/or the radial direction of the rotary drum 1.

The tire position control portion 5 adjusts the position of the tire T with respect to the rotary drum 1 in the example shown in FIGS. 1 to 3, but may adjust the position of the rotary drum 1 with respect to the tire T or may adjust the positions of both the tire T and the rotary drum 1 in other examples.

In the example shown in FIGS. 1 to 3, the tire position control portion 5 includes a spindle shaft 5A connected to the tire T, the tire driving portion 6, and the tire angle control portion 7.

The tire driving portion 6 is, for example, a motor or the like that rotationally drives the tire T. The tire driving portion 6 can rotationally drive the tire T in both a normal direction and a reverse direction, and can adjust the rotational speed of the tire T.

The tire angle control portion 7 controls the angle of the tire T with respect to the rotary drum 1. In detail, the tire angle control portion 7 can give a camber angle CA to the tire T. Further, the tire angle control portion 7 can give a slip angle SA to the tire T. Furthermore, the tire angle control portion 7 can give a grip force to the tire T by bringing the tire T in contact with the rotary drum 1. That is, the tire angle control portion 7 can reproduce a tire attitude, which is obtained at the time of cornering or the like of an actual vehicle, on the tire T by adjusting the camber angle CA, the slip angle SA, and/or the grip force of the tire T.

The tire angle control portion 7 can also adjust any one or both of the camber angle CA and the slip angle SA to be given to the tire T to 0°. In a case where both of the camber angle CA and the slip angle SA to be given to the tire T are adjusted to 0°, a tire attitude obtained in a case where the actual vehicle travels straight is reproduced on the tire T.

In the example shown in FIGS. 1 to 3, the rotational position of the rotary drum 1 is detected by the drum-side rotational position detecting portion 8. In detail, the drum-side rotational position detecting portion 8 can detect the rotational position of the stress measuring portion 3 embedded on the rotary drum 1.

In the example shown in FIGS. 1 to 3, a position directly under a load where the rotary drum 1 and the tire T are in contact with each other is set as a reference position B (see FIG. 3). The drum-side rotational position detecting portion 8 detects the rotational position of the stress measuring portion 3 with respect to the reference position B.

The drum-side rotational position detecting portion 8 is, for example, a rotary encoder or the like that is disposed on the drum shaft 2A of the drum driving portion 2.

In the example shown in FIGS. 1 to 3, the rotational position of the tire T can be detected by the tire-side rotational position detecting portion 9. In detail, the tire-side rotational position detecting portion detects the rotational position of the tire T with respect to the reference position B. The tire-side rotational position detecting portion 9 is, for example, a rotary encoder or the like that is disposed on the spindle shaft 5A of the tire position control portion 5.

The rotational position of the stress measuring portion 3 with respect to the reference position B that is detected by the drum-side rotational position detecting portion 8 and the rotational position of the tire T with respect to the reference position B that is detected by the tire-side rotational position detecting portion 9 are input to the processing portion 4. The processing portion 4 calculates a position in the circumferential direction on the tire T where the stress measuring portion 3 is in contact with the tire T on the basis of the rotational position of the stress measuring portion 3 with respect to the reference position B and the rotational position of the tire T with respect to the reference position B.

In the example shown in FIGS. 1 to 3, the tire air pressure changing portion 10 has, for example, a function to change the air pressure of the tire T during a period where the tire angle control portion 7 changes the camber angle, the slip angle, and/or the grip force of the tire T, or the like and can predict and grasp the behavior and the like of the actual vehicle at the time of occurrence of so-called puncture.

In the example shown in FIGS. 1 to 3, the vehicle characteristic measuring portion 200 includes: a test vehicle 201 that includes a vehicle body 203, wheels 202, and a steering wheel 205; a mount portion (suspension characteristic measuring portion) 210; and a controller (computer) 220.

The mount portion 210 includes support parts 214 on which the test vehicle 201 is to be placed and a measuring instrument 215.

The support parts 214 can independently displace the vehicle body 203 and the wheels 202. In detail, the support parts 214 can independently displace the vehicle body 203 and the wheels 202 in a longitudinal direction, a lateral direction, a vertical direction, a pitch direction, and a roll direction of the test vehicle 201.

The support parts 214 may be slidable with respect to the wheels 202 so that the generation of a longitudinal force, a lateral force, a cornering force, a slip ratio, and a slip angle that can be generated on a tire during the travel of a vehicle can be achieved.

The measuring instrument 215 measures the amount of displacement and/or the acting force of the vehicle body 203 and the amounts of displacement and/or the acting forces of the wheels 202. In detail, the measuring instrument 215 measures acting forces that act on the support parts 214. Further, the measuring instrument 215 measures the camber angles, the toe angles, the steering angles, and the like of the wheels 202. Furthermore, the measuring instrument 215 measures a force or torque that acts on an axle (not shown). Moreover, the measuring instrument 215 measures the stroke and the acting force of a suspension.

The controller 220 controls the amount of displacement that is given to the vehicle body 203 by the support parts 214, and the amounts of displacement that are given to the wheels 202 by the support parts 214.

A mechanism that drives the steering wheel 205 to control the steering angles of the wheels 202 is provided in the example shown in FIGS. 1 to 3, but the steering wheel 205 may not be provided in other examples.

In the example shown in FIGS. 1 to 3, the vehicle behavior simulation portion 300 predicts the behavior of the actual vehicle during travel on the basis of information that was input by a worker. In detail, the vehicle behavior simulation portion 300 predicts the behavior of the actual vehicle during travel while reflecting vehicle characteristics that are predicted from the tire ground contact characteristics calculated by the processing portion 4 of the tire ground contact characteristic measuring portion 100, and the amount of displacement and/or the acting force of the vehicle body 203 and the amounts of displacement and/or the acting forces of the wheels 202, which are measured by the measuring instrument 215 of the vehicle characteristic measuring portion 200, in a vehicle model of the vehicle behavior simulation portion 300.

The vehicle behavior simulation portion 300 is a computer that simulates the behavior of the actual vehicle during travel; includes a CPU as arithmetic processing portion, a ROM, a RAM, and an HDD as storage portions, and an interface as communication portion; and operates on the basis of a program stored in the storage portion. Further, the vehicle behavior simulation portion 300 includes an input portion, such as a keyboard and a mouse, and a display portion, such as a monitor. A steering wheel, an accelerator, a brake, and the like that can reproduce a driving state can also be used as the input portion. The input portion is operated by a worker, and information, such as parameters required to predict the behavior of the actual vehicle during travel, is input to the input portion. The estimated behavior of the actual vehicle during travel and the like are displayed on the display portion using the vehicle model.

Figure 4:
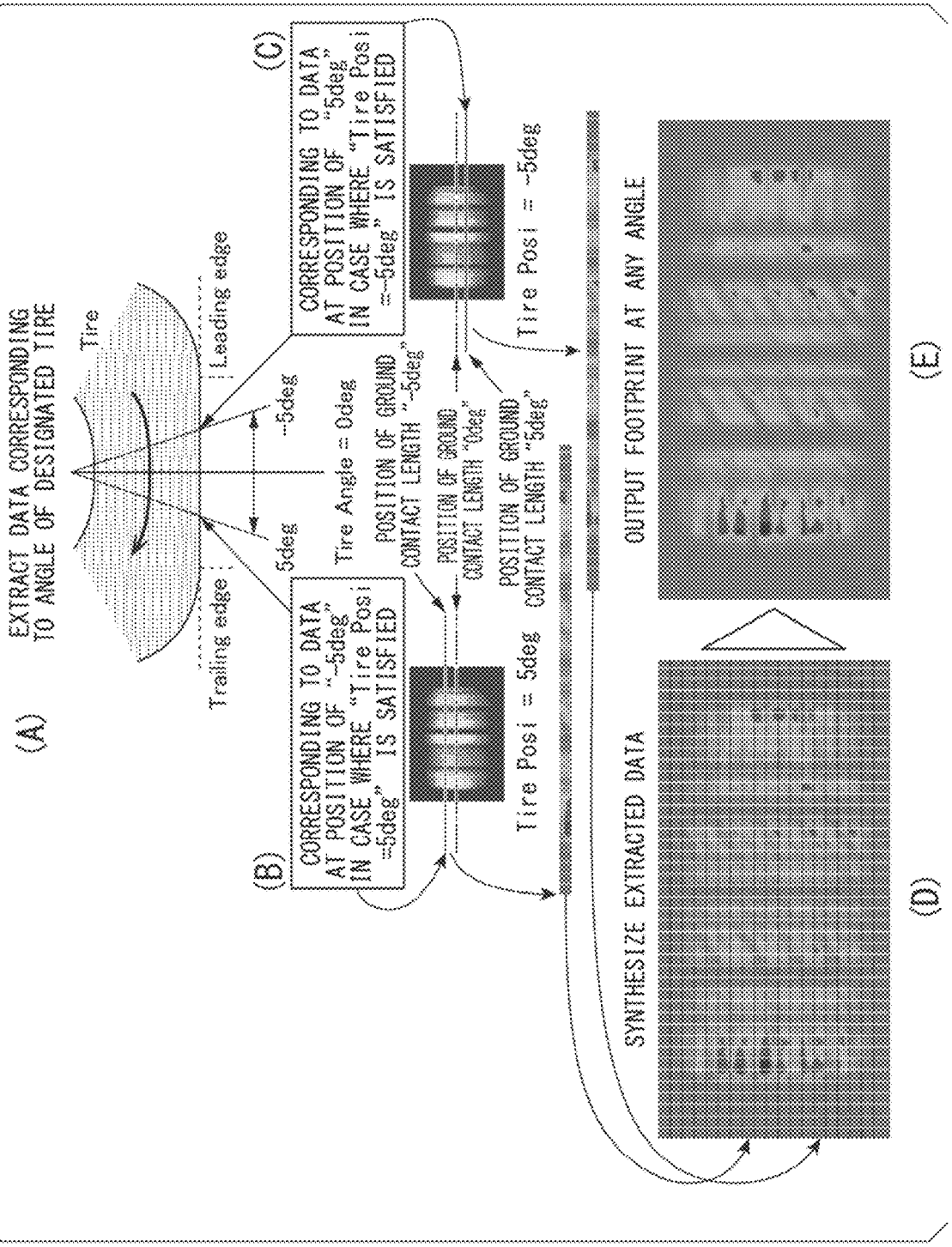
FIG. 4 is a diagram showing an example of a method in which tire ground contact characteristics are calculated by a processing portion of a tire ground contact characteristic measuring portion.

FIG. 4 is a diagram showing an example of a method in which tire ground contact characteristics are calculated by the processing portion 4 of the tire ground contact characteristic measuring portion 100.

In detail, portion (A) of FIG. 4 is a diagram showing a leading edge and a trailing edge of the ground contact region T1A of the tread surface T1 of the tire T. Portion (B) of FIG. 4 is a diagram conceptually showing stress at a position of "5 deg" measured by the stress measuring portion 3 in a case where the tread surface T1 of the tire T is in contact with the stress measuring portion 3 at the position of "5 deg" in the circumferential direction. Portion (C) of FIG. 4 is a diagram conceptually showing stress at a position of "−5 deg" measured by the stress measuring portion 3 in a case where the tread surface T1 of the tire T is in contact with the stress measuring portion 3 at the position of "−5 deg" in the circumferential direction. Portion (D) of FIG. 4 is a diagram conceptually showing processing for synthesizing stress data at a plurality of positions in the circumferential direction on the tread surface T1 of the tire T that were measured by the stress measuring portion 3. Portion (E) of FIG. 4 is a diagram showing an example of a grip force distribution in the ground contact region T1A that was visualized by the processing portion 4.

In the example shown in FIG. 4, the processing portion 4 records a position on the tread surface T1 of the tire T where the tire T stepped on the stress measuring portion 3 (i.e., a position in the circumferential direction of the tire T where the tire was in contact with the stress measuring portion 3). The stress measuring portion 3 is not only in contact with the tread surface T1 of the tire T at the reference position B (a position directly under a load) but is also in contact with the tread surface T1 of the tire T at a position other than the reference position B. That is, the stress measuring portion 3 remains in contact with the tread surface T1 of the tire T during a period until the stress measuring portion 3 comes into contact with the trailing edge of the ground contact region T1A after the stress measuring portion 3 coming into contact with the leading edge of the ground contact region T1A. For this reason, the stress measuring portion 3 can acquire a change in stress from the leading edge to the trailing edge.

In detail, not only is stress at a position of "Tire Angle=0 deg" (see the portion (A) of FIG. 4) measured by the stress measuring portion 3 but stress at a position of "Tire Posi=5 deg" (see the portion (B) of FIG. 4) corresponding to a position of "5 deg" in the portion (A) of FIG. 4 is also measured by the stress measuring portion 3. Further, stress at a position of "Tire Posi=−5 deg" (see the portion (C) of FIG. 4) corresponding to a position of "−5 deg" in the portion (A) of FIG. 4 is also measured by the stress measuring portion 3.

Furthermore, stress at all positions in the circumferential direction on the tread surface T1 of the tire T is measured by the stress measuring portion 3. The processing portion 4 continues to make a record until the tread surface T1 of the tire T comes into contact with the stress measuring portion 3 at all positions in the circumferential direction in a series of traveling behaviors.

In detail, stress measuring portion can also be disposed to cover the entire circumference of the rotary drum 1. However, in order to bring the tread surface T1 of the tire T in contact with the stress measuring portion 3 at all ground contact positions during a period where a transient change occurs, for example, a braking force can also be given to the tire T. Accordingly, since the circumferential speed of the tire T and the circumferential speed of the rotary drum 1 can be made different from each other, all positions in the circumferential direction on the tread surface T1 of the tire T can also be caused to face the stress measuring portion 3. Regardless of what method is used to measure stress, stress can be more efficiently measured in a case where the stress measuring portion is disposed in the width direction of the rotary drum 1 at a plurality of ground contact points of the rotary drum 1. In a case where a plurality of sensors, which are installed in a line in the width direction, are installed to alternate in a plurality of lines, measurement time can be shortened and the resolution of the stress distributions and the like can be improved. Further, it is possible to simplify a measuring portion itself by reducing the number of positions where the stress measuring portion is disposed.

After the ground contact characteristics of the tire T at all the ground contact positions accompanied by transient changes as described above are measured, stress data at a plurality of positions in the circumferential direction on the tread surface T1 of the tire T, which were measured by the stress measuring portion 3, are synthesized by the processing portion 4 as shown in the portion (D) of FIG. 4 in the example shown in FIG. 4. After that, the processing portion 4 can generate, for example, a visualized grip force distribution in the ground contact region T1A as shown in the portion (E) of FIG. 4. In a case where a plurality of measurement results were obtained at the same position on the tire T because the stress measuring portion 3 faces the same position in the ground contact region T1 of the tire T, for example, during measurement in the tire ground contact characteristic measuring portion 100, it is preferable to use an average of these measurement results as a measurement result.

Further, in a case where the rotational position of the rotary drum 1 and the rotational position of the tire T are synchronized with each other and measured by the drum-side rotational position detecting portion 8 and the tire-side rotational position detecting portion 9, the measurement of a tire footprint including patterns (i.e., the calculation of the tire ground contact characteristics of the ground contact region T1A including lug grooves and the like) can also be achieved.

Figure 5:
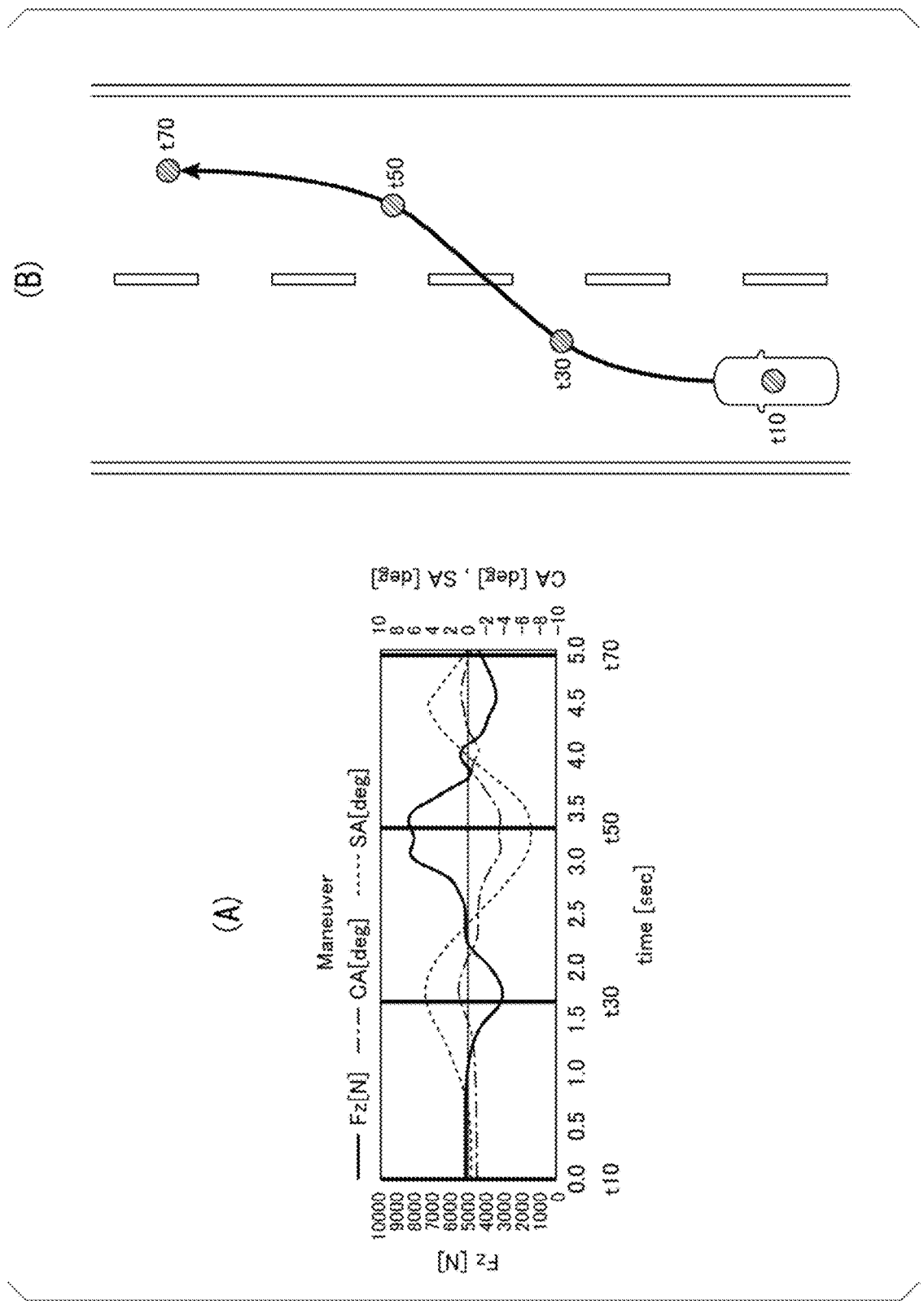

FIG. 5 is a diagram showing an example of a transient change in a tire attitude occurring during the travel of the actual vehicle that is reproduced on the tire T by the tire ground contact characteristic measuring portion 100, and the like.

In detail, a portion (A) of FIG. 5 is a diagram showing the temporal changes of a grip force Fz [N], a camber angle CA [deg], and a slip angle SA [deg] to be given to the tire T by the tire angle control portion 7 of the tire ground contact characteristic measuring portion 100. In the portion (A) of FIG. 5, a horizontal axis represents time [sec] and a vertical axis represents a grip force Fz [N], a camber angle CA [deg], and a slip angle SA [deg].

A portion (B) of FIG. 5 shows the traveling states of the actual vehicle corresponding to the temporal changes of a grip force Fz [N], a camber angle CA [deg], and a slip angle SA [deg] shown in the portion (A) of FIG. 5.

In the example shown in FIG. 5, the actual vehicle changes a lane to a right lane from a left lane of the portion (B) of FIG. 5 in five seconds from 0 [sec] (time t10) to 5 [sec] (time t70) shown on the horizontal axis of the portion (A) of FIG. 5.

That is, in the example shown in FIG. 5, in order to reproduce a transient change in the tire attitude of the actual vehicle occurring during the change of a lane shown in the portion (B) of FIG. 5 on the tire T, the tire angle control portion 7 changes a grip force Fz [N], a camber angle CA [deg], and a slip angle SA [deg] to be given to the tire T with the passage of time as shown in the portion (A) of FIG. 5. That is, the tire angle control portion 7 reproduces a transient change in a tire attitude that occurs during the travel of the actual vehicle by changing the camber angle CA [deg], the slip angle SA [deg], and/or the grip force Fz [N] of the tire T.

In detail, a measuring method in a case where one stress measuring portion is disposed in the width direction on the circumferential surface of the rotary drum 1 is exemplified in the example shown in FIG. 5. In order to measure the stress of the tread surface T1 of the tire T at a time t10, a time t30, a time t50, and a time t70 by the stress measuring portion 3, the stress measuring portion 3 is disposed at the reference position B (a position directly under a load) at the time t10. Then, the rotary drum 1 makes one rotation and the stress measuring portion 3 is positioned at the reference position B at the time t30. After that, the rotary drum 1 makes one rotation and the stress measuring portion 3 is positioned at the reference position B at the time t50. Then, the rotary drum 1 makes one rotation and the stress measuring portion 3 is positioned at the reference position B at the time t70. As a result, the stress of the tread surface T1 of the tire T at the time t10, the time t30, the time t50, and the time t70 can be measured by the stress measuring portion 3.

Figure 6:
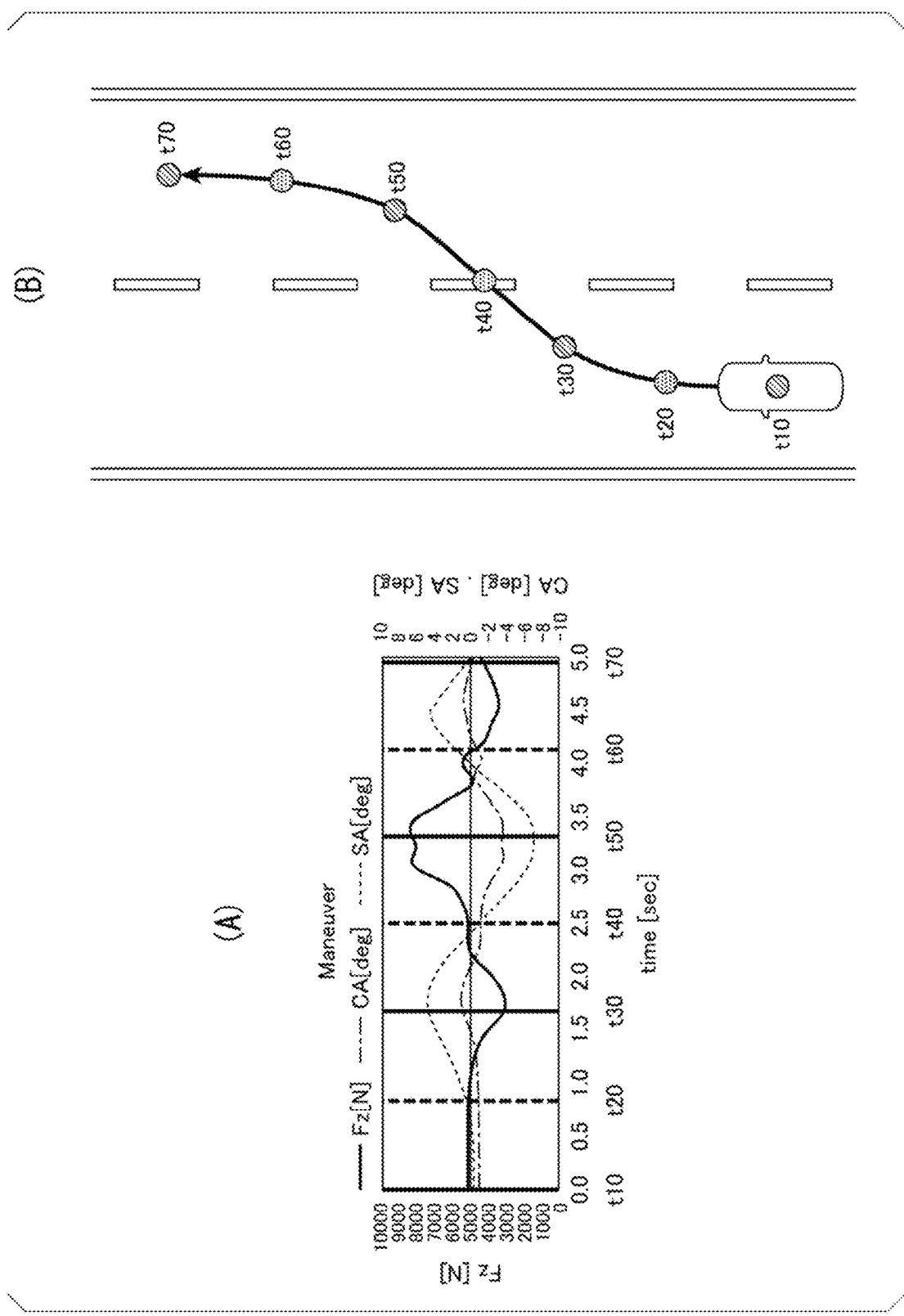
FIG. 6 is a diagram in which the position of the rotary drum at the time of start of measurement is shifted by an angle of 180° and measurement positions are added to the example shown in FIG. 5.

FIG. 6 is a diagram in which the position of the rotary drum at the time of start of measurement is shifted by an angle of 180° and measurement positions are added to the example shown in FIG. 5. In detail, as in the portion (A) of FIG. 5, a portion (A) of FIG. 6 shows the temporal changes of a grip force Fz [N], a camber angle CA [deg], and a slip angle SA [deg] to be given to the tire T by the tire angle control portion 7 of the tire ground contact characteristic measuring portion 100. As in the portion (B) of FIG. 5, a portion (B) of FIG. 6 shows the traveling states of the actual vehicle corresponding to the temporal changes of a grip force Fz [N], a camber angle CA [deg], and a slip angle SA [deg] shown in the portion (A) of FIG. 6.

In FIG. 6, a time t20 is a time when the rotary drum 1 is rotated from the state of the time t10 by an angle of 180°. A time t40 is a time when the rotary drum 1 is rotated from the state of the time t30 by an angle of 180°. A time t60 is a time when the rotary drum 1 is rotated from the state of the time t50 by an angle of 180°.

In the example shown in FIG. 6, in order to measure the stress of the tread surface T1 of the tire T at the time t20, the time t40, and the time t60 by the stress measuring portion 3, the stress measuring portion 3 is disposed on a position on the rotary drum 1 which is opposite from the reference position B (a position directly under a load) across the center of the rotary drum 1 at the time t10. Then, the rotary drum 1 makes a half rotation and the stress measuring portion 3 is positioned at the reference position B at the time t20. After that, the rotary drum 1 makes one rotation and the stress measuring portion 3 is positioned at the reference position B at the time t40. Then, the rotary drum 1 makes one rotation and the stress measuring portion 3 is positioned at the reference position B at the time t60. As a result, the stress of the tread surface T1 of the tire T at the time t20, the time t40, and the time t60 can be measured by the stress measuring portion 3.

Figure 7:
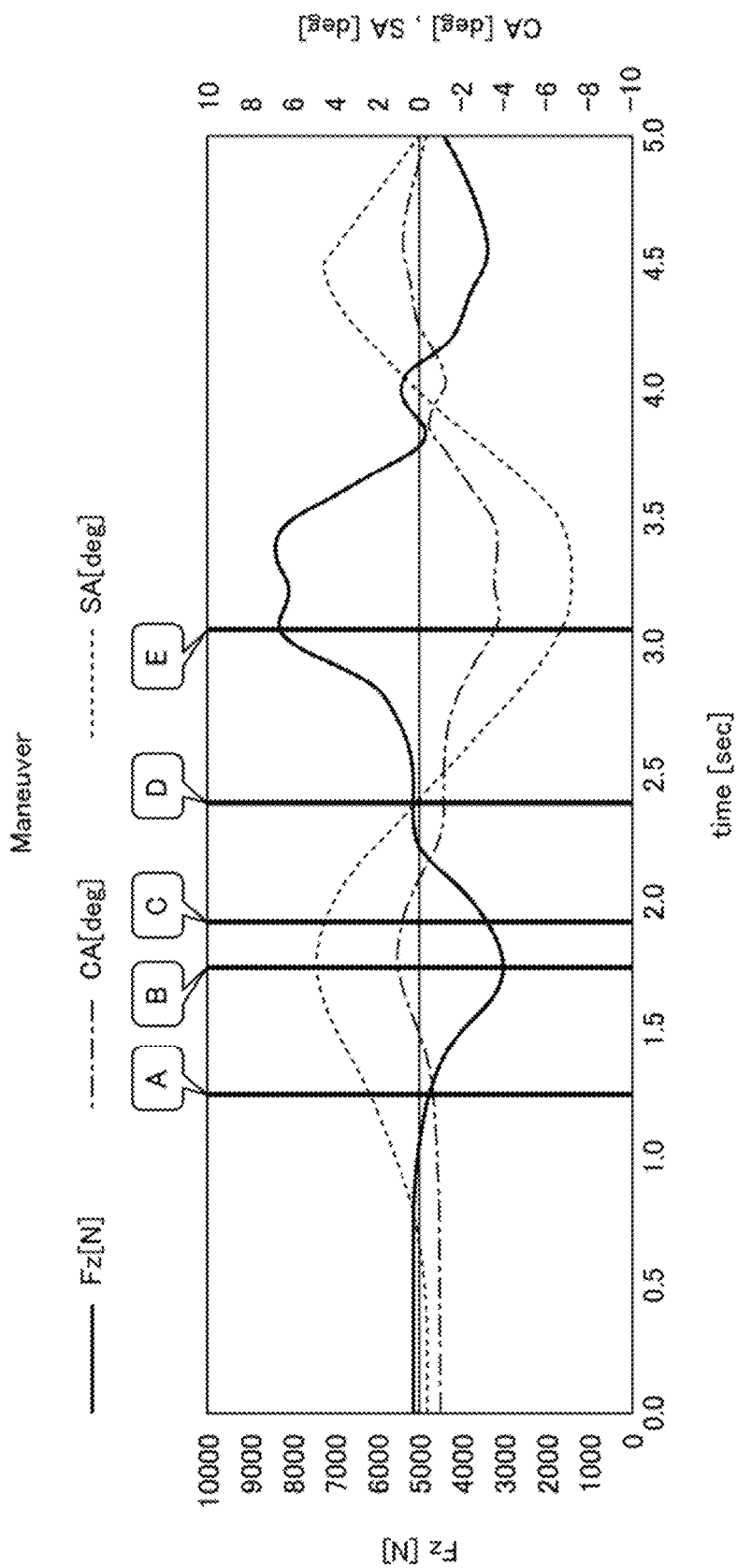
FIG. 7 is a diagram showing the temporal changes of a grip force Fz [N], a camber angle CA [deg], and a slip angle SA [deg] to be given to the tire by a tire angle control portion of the tire ground contact characteristic measuring portion.

FIG. 7 is a diagram showing the temporal changes of a grip force Fz [N], a camber angle CA [deg], and a slip angle SA [deg] to be given to the tire T by the tire angle control portion 7 of the tire ground contact characteristic measuring portion 100.

In FIG. 7, a time A corresponds to a time between the time t20 and the time t30 shown in FIG. 6. A time B corresponds to the time t30 shown in FIG. 5 and FIG. 6. A time C and a time D correspond to times between the time t30 and the time t40 shown in FIG. 6. A time E corresponds to a time between the time t40 and the time t50 shown in FIG. 6.

Figure 8:
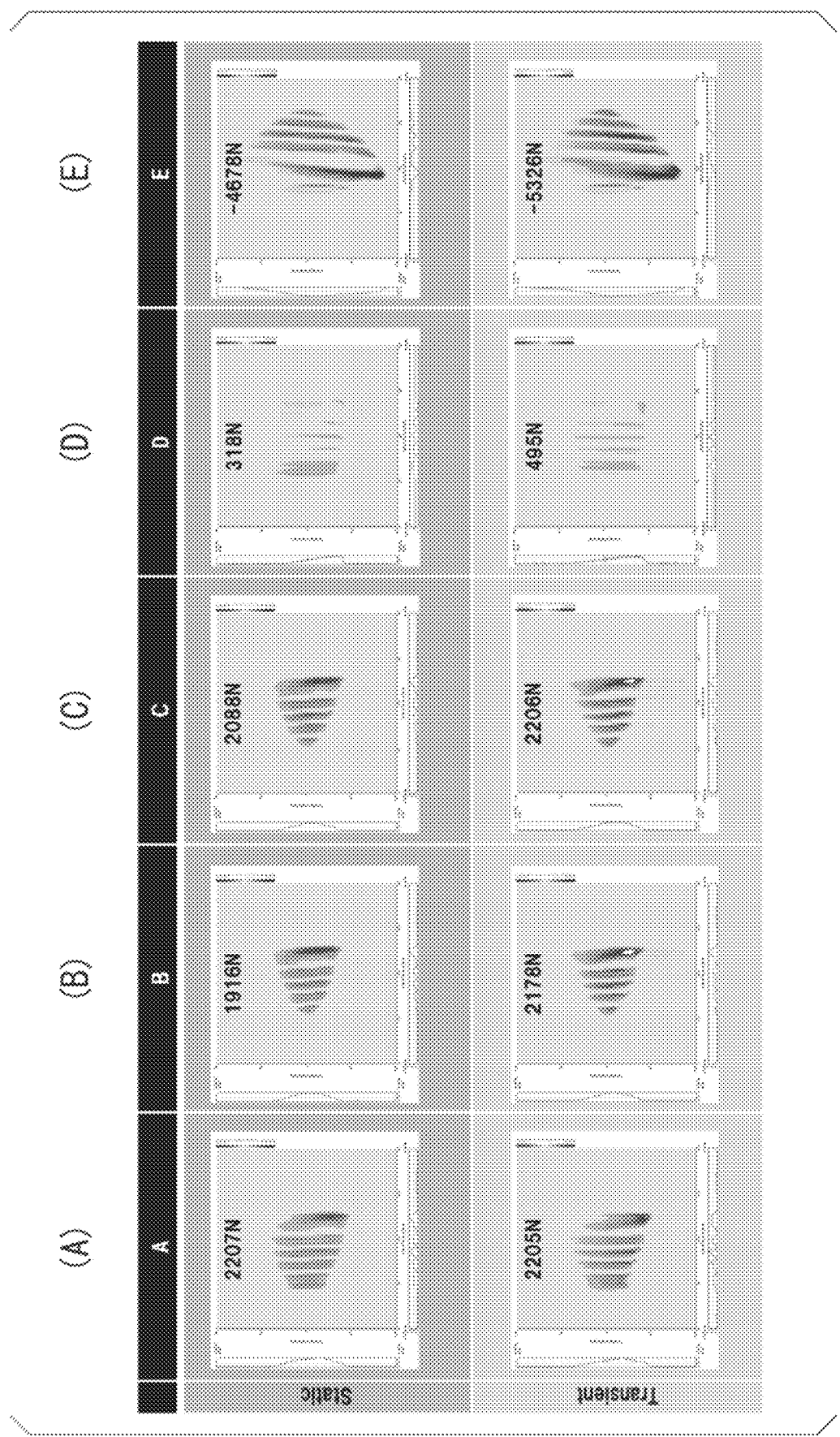
FIG. 8 is a diagram showing a difference between a shear stress distribution in a width direction that was calculated by the processing portion of the tire ground contact characteristic measuring portion of the present invention and a shear stress distribution in a width direction that was calculated by a conventional tire ground contact characteristic measuring portion as a comparative example.

FIG. 8 is a diagram showing a difference between a shear stress distribution in the width direction that was calculated by the processing portion 4 of the tire ground contact characteristic measuring portion 100 of the present invention and a shear stress distribution in the width direction that was calculated by a conventional tire ground contact characteristic measuring portion as a comparative example.

In detail, a shear stress distribution in the width direction at the time A that was calculated by the conventional tire ground contact characteristic measuring portion is shown on the upper side in a portion (A) of FIG. 8, and a shear stress distribution in the width direction at the time A that was calculated by the processing portion 4 of the tire ground contact characteristic measuring portion 100 of the present invention is shown on the lower side in the portion (A) of FIG. 8.

In the tire ground contact characteristic measuring portion 100 of the present invention, the drum driving portion 2, the tire position control portion 5, the tire driving portion 6, and the tire angle control portion 7 operated during a period from the time t10 to the time t70 in order to reproduce a transient change in the tire attitude of the actual vehicle occurring during the change of a lane shown in the portion (B) of FIG. 6 on the tire T. Further, the processing portion 4 calculated a shear stress distribution in the width direction corresponding to a transient tire attitude where the behavior of the actual vehicle occurring at the time A during the period (the time t10 to the time t70) where a transient change occurs was reproduced.

On the other hand, in the conventional tire ground contact characteristic measuring portion serving as the comparative example, the processing portion 4 calculated a shear stress distribution in the width direction at the time A in a state where a grip force Fz [N], a camber angle CA [deg], and a slip angle SA [deg] to be given to the tire T by the tire angle control portion 7 are maintained at values obtained at a point of the time A.

Likewise, the processing portion 4 also calculated a shear stress distribution in the width direction corresponding to a transient tire attitude where the behavior of the actual vehicle occurring at each of the times B, C, D, and E was reproduced (the present invention) and a shear stress distribution in the width direction which is fixed to a tire attitude at each time (comparative example).

As shown in FIG. 8, the shear stress distributions in the width direction at the times A, B, C, D, and E that were calculated by the processing portion 4 of the tire ground contact characteristic measuring portion 100 of the present invention were different from the shear stress distributions in the width direction at the times A, B, C, D, and E that were calculated by the conventional tire ground contact characteristic measuring portion as the comparative example.

Figure 9:
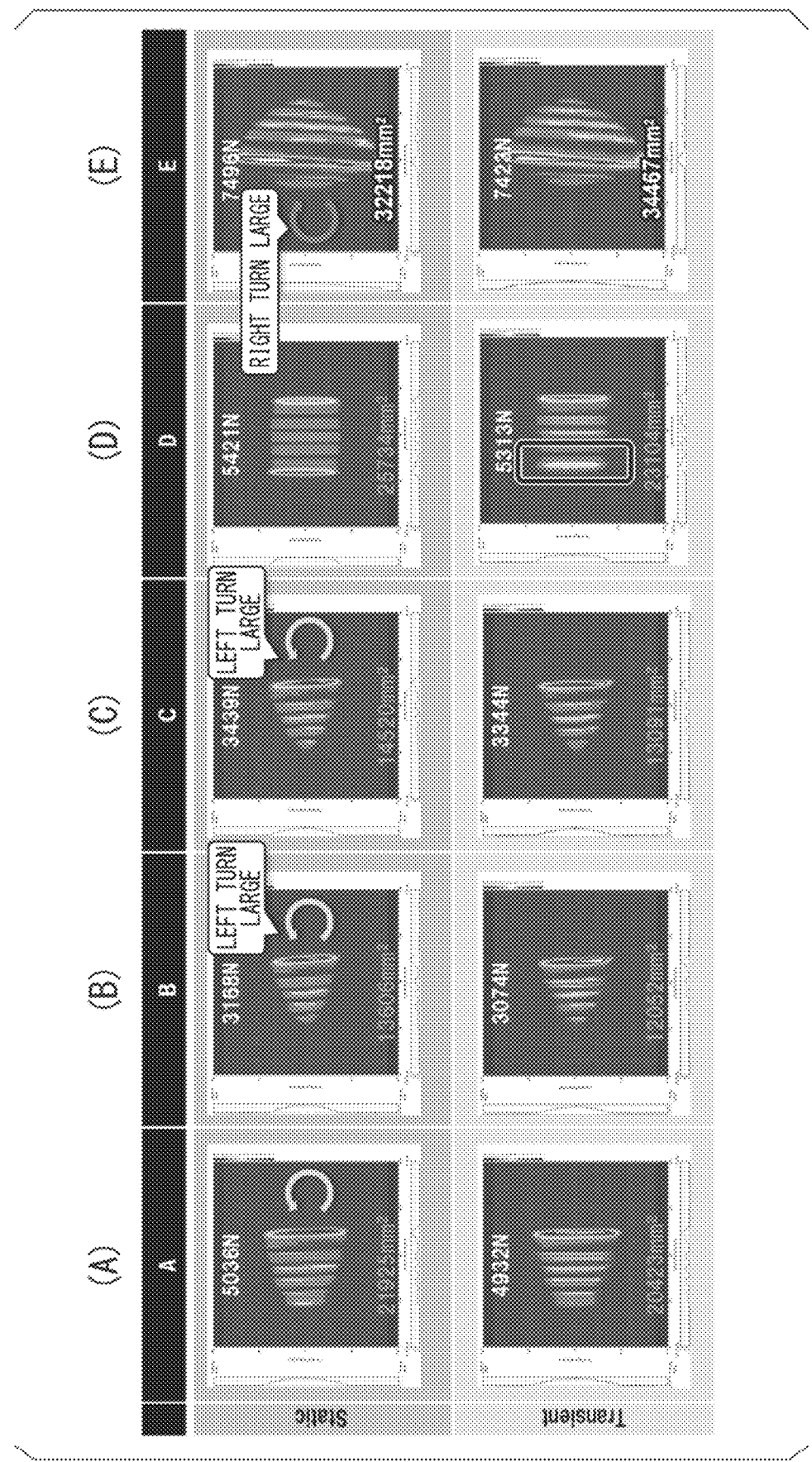
FIG. 9 is a diagram showing a difference between a grip force distribution that was calculated by the processing portion of the tire ground contact characteristic measuring portion of the present invention and a grip force distribution that was calculated by the conventional tire ground contact characteristic measuring portion as the comparative example.

FIG. 9 is a diagram showing a difference between a grip force distribution that was calculated by the processing portion 4 of the tire ground contact characteristic measuring portion 100 of the present invention and a grip force distribution that was calculated by the conventional tire ground contact characteristic measuring portion as the comparative example.

In detail, a grip force distribution at the time A that was calculated by the conventional tire ground contact characteristic measuring portion is shown on the upper side in a portion (A) of FIG. 9, and a grip force distribution at the time A that was calculated by the processing portion 4 of the tire ground contact characteristic measuring portion 100 of the present invention is shown on the lower side in the portion (A) of FIG. 9.

As with the above-mentioned shear stress distribution in the width direction, the processing portion 4 also calculated a grip force distribution corresponding to a transient tire attitude where the behavior of the actual vehicle occurring at each of the times B, C, D, and E was reproduced (the present invention) and a grip force distribution which was fixed to a tire attitude at each time (comparative example). As shown in FIG. 9, the grip force distribution (ground contact area) at each time that was calculated by the processing portion 4 of the tire ground contact characteristic measuring portion 100 of the present invention was different from the grip force distribution (ground contact area) at each time that was calculated by the conventional tire ground contact characteristic measuring portion as the comparative example.

In an actual vehicle test, it is difficult to control changes in environmental conditions, such as the condition or temperature of a road surface, an atmospheric temperature, and an atmospheric pressure, and cost, effort, and time are required. However, in the vehicle action simulation system 400, a transient tire force, which could not be measured in a conventional drum test, can be measured through a transient change in the attitude angle of the tire. For this reason, the evaluation of a tire during the travel of the actual vehicle can be transiently performed in the vehicle action simulation system 400.

In particular, in the vehicle action simulation system 400, the attitude angle of the tire obtained from an objective test portion (vehicle characteristic measuring portion 200) is reflected in the attitude angle of the tire obtained from the travel of the actual vehicle, and a tire force obtained from a drum test portion (tire ground contact characteristic measuring portion 100) is reflected in the objective test portion. Accordingly, the simulation accuracy of the vehicle behavior simulation portion 300 can be improved.

According to the vehicle action simulation system 400, tire characteristics (the behavior of the tire) can be grasped by using the tire ground contact characteristics that were calculated by the processing portion 4 of the tire ground contact characteristic measuring portion 100, suspension characteristics (tire attitude) can be grasped by using the amounts of displacement and/or the acting forces of the vehicle body 203 and the wheels 202 that were measured by the measuring instrument 215 of the vehicle characteristic measuring portion 200, and the behavior of the vehicle (the behavior of the actual vehicle) can be grasped by using the behavior of the actual vehicle during travel that was predicted by the vehicle behavior simulation portion 300. As a result, a relationship between the tire characteristics, the suspension characteristics, and the behavior of the vehicle (the behavior of the actual vehicle) can be clarified.

That is, according to the vehicle action simulation system 400, the transient characteristics of the actual tire T and the transient characteristics of (the suspension, the bush, and the like of) the actual test vehicle 201 can be reflected in the behavior of the actual vehicle during travel (i.e., the result of a vehicle behavior simulation), and the mechanism of the results of the actual vehicle test can be easily explained through the quantification of various phenomena.

Through diligent research, the inventors and the like of the present invention confirmed that the behavior of the actual vehicle during travel (i.e., the result of the vehicle behavior simulation) predicted by the vehicle behavior simulation portion 300 is changed in a case where the type of the tire T applied to the tire ground contact characteristic measuring portion 100 is changed.

That is, through diligent research, the inventors and the like of the present invention found that the merits and demerits of the tire T can be evaluated even without performing a traveling test of the actual vehicle on which the tires T are mounted by using the vehicle behavior simulation portion 300.

Figure 10:
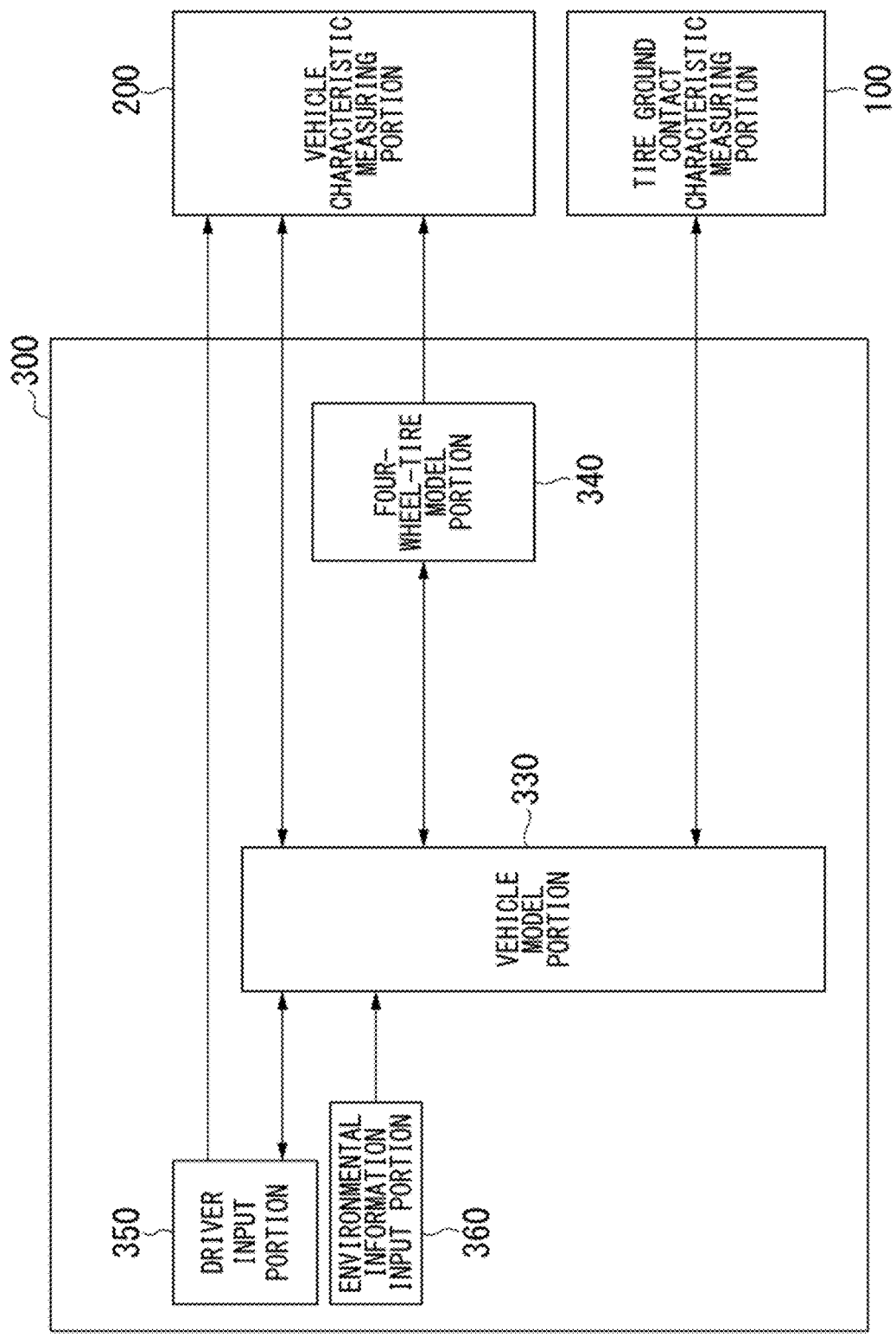
FIG. 10 is a diagram showing an example of a functional block of a vehicle behavior simulation portion.

FIG. 10 is a diagram showing an example of a functional block of the vehicle behavior simulation portion 300.

In the example shown in FIG. 10, the vehicle behavior simulation portion 300 includes a vehicle model portion 330, a four-wheel-tire model portion 340, a driver input portion 350, and an environmental information input portion 360.

The vehicle model portion 330 is connected to the four-wheel-tire model portion 340, the driver input portion 350, the environmental information input portion 360, the tire ground contact characteristic measuring portion 100, and the vehicle characteristic measuring portion 200.

The four-wheel-tire model portion 340 is connected to the vehicle characteristic measuring portion 200. The driver input portion 350 is connected to the vehicle characteristic measuring portion 200.

The driver input portion 350 transmits data related to a driver's operations and signals substituting for a steering angle, the accelerator, and the brake to the vehicle model portion 330. Since information about the position and the like of the vehicle is received from the vehicle model portion 330 as information about the operation results of the vehicle, simulation results can be visually displayed on a monitor or the like.

Since the environmental information input portion 360 transmits signals and data related to the environment around an object to be simulated to the vehicle model portion 330, simulation can be performed under arbitrary weather, arbitrary conditions of the road surface, and the like.

The vehicle model portion 330 can send information about an inertial force acting on the center of the vehicle and about a roll angle to the vehicle characteristic measuring portion 200, and can transmit information about an inertial force acting on the axis of the tire, a slip angle, a camber angle, torque, the speed of the vehicle, and the like to the four-wheel-tire model portion 340.

The four-wheel-tire model portion 340 can transmit the calculation result of the axial force of the tire to the vehicle characteristic measuring portion 200.

The vehicle characteristic measuring portion 200 can calculate inertial forces acting on the center of the vehicle and on the axis of the tire and the like and can return the calculated results to the vehicle model portion 330.

Information, such as the speed of the tire, a rotational speed, a slip angle, a camber angle, and a grip force, can be transmitted to the tire ground contact characteristic measuring portion 100, and an inertial force acting on the axis of the tire and the values of stress and a moment acting in the circumferential direction and in the width direction are calculated and calculation results can be returned to the vehicle model portion 330.

Further, since simulation signals substituting for various sensors are transmitted to an electronic control unit (ECU) 206 from the vehicle model portion 330, the vehicle characteristic measuring portion 200 can also cause the electronic control unit to recognize a traveling state. An electronic control unit (ECU) 206 mounted on the test vehicle 201 of the vehicle characteristic measuring portion 200 can be used as the electronic control unit (ECU) 206.

Figure 11:
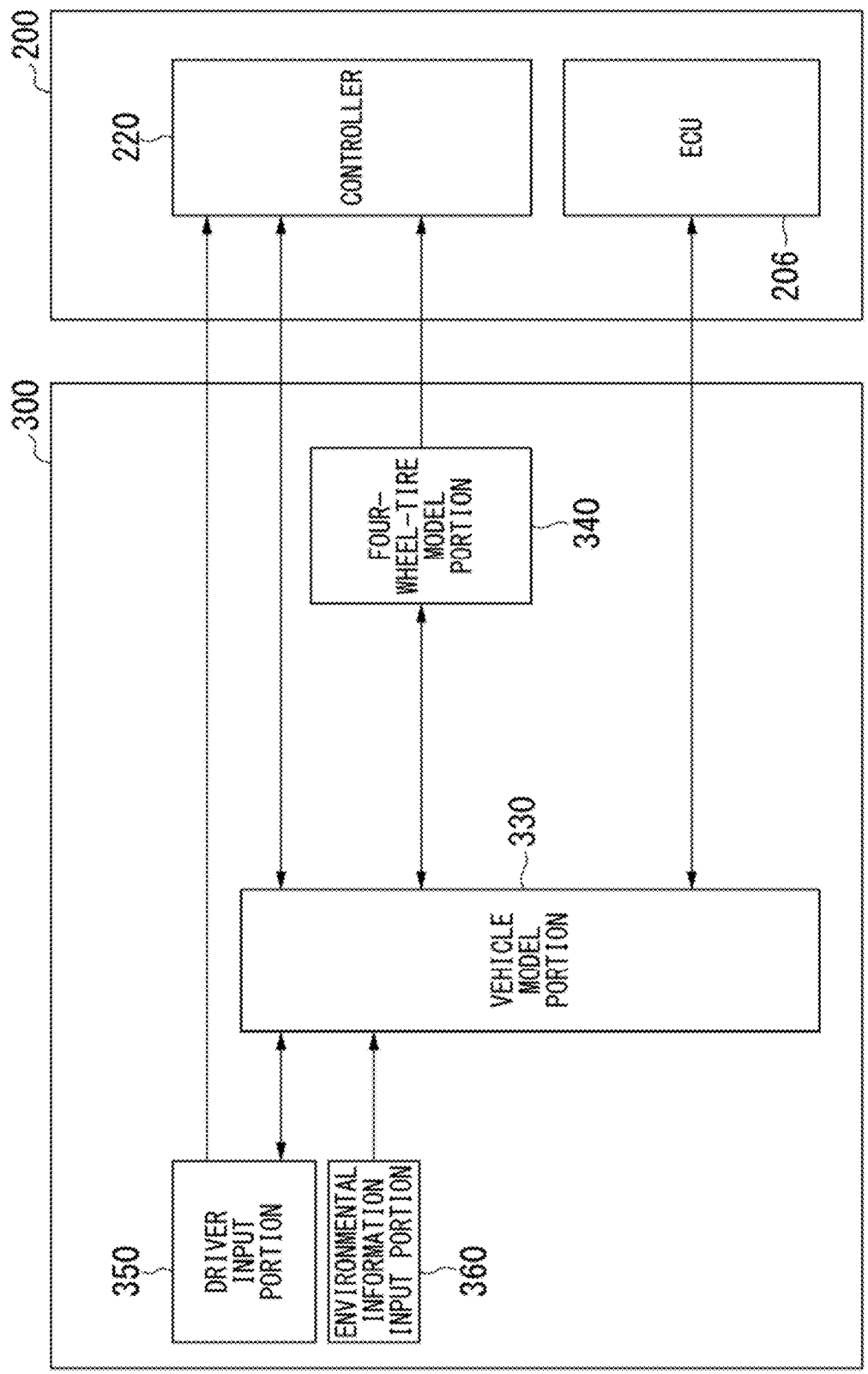
FIG. 11 is a diagram showing an example of a functional block of a vehicle characteristic measuring portion and the like that includes an electronic control unit (ECU).

FIG. 11 is a diagram showing an example of a functional block of the vehicle characteristic measuring portion 200 and the like that includes the electronic control unit (ECU) 206.

FIG. 12 is a sequence diagram showing the details of processing performed in the vehicle action simulation system 400 according to the present invention.

In an example shown in FIG. 12, in Step SM, the vehicle behavior simulation portion 300 starts the preprocessing of simulation.

Then, in Step S52, the tire ground contact characteristic measuring portion 100 is moved to a standby position.

Further, in Step S53, the vehicle characteristic measuring portion 200 is moved to a standby position.

Then, in Step S54, the tire ground contact characteristic measuring portion 100 transmits a movement completion flag to the vehicle behavior simulation portion 300.

Further, in Step S55, the vehicle characteristic measuring portion 200 transmits a movement completion flag to the vehicle behavior simulation portion 300.

Then, in Step S56, the vehicle behavior simulation portion 300 confirms the movement completion flag that was transmitted from the tire ground contact characteristic measuring portion 100 and the movement completion flag that was transmitted from the vehicle characteristic measuring portion 200.

After that, in Step S57, the vehicle behavior simulation portion 300 resets the vehicle state of the simulation.

Then, in Step S58, the vehicle behavior simulation portion 300 confirms the stability of the vehicle of the simulation.

After that, in Step S59, the vehicle behavior simulation portion 300 stands by for the simulation in an initial state.

Then, in Step S60, the vehicle behavior simulation portion 300 transmits an instruction to move to an initial state to the tire ground contact characteristic measuring portion 100 and transmits an instruction to move to an initial state to the vehicle characteristic measuring portion 200.

After that, in Step S61, the tire ground contact characteristic measuring portion 100 is moved according to the instruction transmitted from the vehicle behavior simulation portion 300.

Further, in Step S62, the vehicle characteristic measuring portion 200 is moved according to the instruction transmitted from the vehicle behavior simulation portion 300.

Then, in Step S63, the tire ground contact characteristic measuring portion 100 shifts to a simulation synchronization mode where the tire ground contact characteristic measuring portion 100 operates in synchronization with the vehicle behavior simulation portion 300.

Furthermore, in Step S64, the vehicle characteristic measuring portion 200 shifts to a simulation synchronization mode where the vehicle characteristic measuring portion 200 operates in synchronization with the vehicle behavior simulation portion 300.

After that, in Step S65, the tire ground contact characteristic measuring portion 100 transmits a shift completion flag, which indicates the completion of shift to the simulation synchronization mode, to the vehicle behavior simulation portion 300.

Further, in Step S66, the vehicle characteristic measuring portion 200 transmits a shift completion flag, which indicates the completion of shift to the simulation synchronization mode, to the vehicle behavior simulation portion 300.

Then, in Step S67, the vehicle behavior simulation portion 300 confirms the shift completion flag transmitted from the tire ground contact characteristic measuring portion 100 and the shift completion flag transmitted from the vehicle characteristic measuring portion 200, and starts the simulation.

After that, in Step S67A, the vehicle behavior simulation portion 300 calculates the vehicle motion of the simulation.

Then, in Step S68, the vehicle behavior simulation portion 300 transmits command values to the tire ground contact characteristic measuring portion 100, the controller 220 of the vehicle characteristic measuring portion 200, and the ECU 206 mounted on the test vehicle 201 of the vehicle characteristic measuring portion 200.

Usually, command values based on the predicted vehicle characteristics can be used as simulation signals substituting for signals to be input to the ECU from various sensors that are used to grasp the traveling state of the vehicle.

The command values to be transmitted to the ECU 206 from the vehicle model include a wheel speed, a yaw rate, the acceleration of the vehicle, acceleration acting on the axis of the tire, and information for complementing vehicle characteristics for various sensors, such as a front radar and a camera. Since these kinds of information are reflected in the ECU 206 and the test vehicle 201 is caused to recognize a traveling state, simulation where a traveling state is accurately reproduced can be performed.

Further, in Step S69, the tire ground contact characteristic measuring portion 100 operates according to the command values transmitted from the vehicle behavior simulation portion 300 (i.e., in synchronization with the vehicle behavior simulation portion 300). In detail, the tire ground contact characteristic measuring portion 100 operates while reflecting the vehicle characteristics (in particular, the axial force of the tire) obtained from the vehicle behavior simulation portion 300. Furthermore, the tire ground contact characteristic measuring portion 100 transmits the data of the tire ground contact characteristics to the vehicle behavior simulation portion 300.

In Step S70, the vehicle characteristic measuring portion 200 operates according to the command values transmitted from the vehicle behavior simulation portion 300 (i.e., in synchronization with the vehicle behavior simulation portion 300). In detail, the vehicle characteristic measuring portion 200 operates while reflecting the vehicle characteristics (in particular, the axial force of the tire) obtained from the vehicle behavior simulation portion 300. Further, the vehicle characteristic measuring portion 200 inputs the command values, which were transmitted from the vehicle behavior simulation portion 300, to the ECU 206 mounted on the test vehicle 201. Furthermore, the vehicle characteristic measuring portion 200 transmits measurement data to the vehicle behavior simulation portion 300.

That is, Steps S68, S69, and S70 are performed in parallel, and the tire ground contact characteristic measuring portion 100, the vehicle characteristic measuring portion 200, and the vehicle behavior simulation portion 300 operate in synchronization with each other.

Then, in Step S70A, the vehicle behavior simulation portion 300 receives data (the data of the tire ground contact characteristics and the measurement data) from the tire ground contact characteristic measuring portion 100 and the vehicle characteristic measuring portion 200.

After that, in Step S70B, the vehicle behavior simulation portion 300 determines whether or not it is time to end the simulation and whether or not the travel distance of the vehicle of the simulation has reached a scheduled travel distance.

In a case where it is not time to end the simulation or in a case where the travel distance of the vehicle of the simulation does not reach the scheduled travel distance, processing returns to Step S67A. On the other hand, in a case where it is time to end the simulation and in a case where the travel distance of the vehicle of the simulation has reaches the scheduled travel distance, processing proceeds to Step S71.

In Step S71, the vehicle behavior simulation portion 300 ends the simulation.

Accordingly, in Step S72, the operation of the tire ground contact characteristic measuring portion 100 is switched to an operation corresponding to an internal command.

Further, in Step S73, the operation of the vehicle characteristic measuring portion 200 is switched to an operation corresponding to an internal command.

After that, in Step S74, the tire ground contact characteristic measuring portion 100 is moved to the standby position.

Furthermore, in Step S75, the vehicle characteristic measuring portion 200 is moved to the standby position.

That is, in the vehicle action simulation method according to an aspect of the present invention, the vehicle behavior simulation portion predicts the behavior of the actual vehicle during travel while reflecting vehicle characteristics that were predicted from the tire ground contact characteristics calculated by the tire ground contact characteristic measuring portion.

For this reason, according to the vehicle action simulation method of one aspect of the present invention, the behavior of the actual vehicle on which the tires are mounted during travel can be simulated with higher accuracy than in a case where the vehicle characteristics predicted from the tire ground contact characteristics are not reflected.

In the reproduction step of the vehicle action simulation method according to one aspect of the present invention, the rotational speed of the rotary drum may be adjusted by a drum driving portion of the tire ground contact characteristic measuring portion, a position of the tire with respect to the rotary drum may be adjusted in a direction of an axis of rotation and/or a radial direction of the rotary drum by a tire position control portion of the tire ground contact characteristic measuring portion, a rotational speed of the tire may be adjusted by a tire driving portion of the tire ground contact characteristic measuring portion, a camber angle, a slip angle, and/or a grip force of the tire may be adjusted by a tire angle control portion of the tire ground contact characteristic measuring portion, and the drum driving portion, the tire position control portion, the tire driving portion, and the tire angle control portion may operate to reproduce the transient change in the tire attitude that occurs during the travel of the actual vehicle on the tire while reflecting the behavior of the actual vehicle during travel predicted in the prediction step.

In a case where such operations are performed in the reproduction step, the transient change in the tire attitude that occurs during the travel of the actual vehicle can be reproduced on the tire more accurately than in a case where such operations are not performed in the reproduction step.

In the vehicle action simulation method according to one aspect of the present invention, in the stress measurement step, a three-component force sensor serving as the stress measuring portion may measure a grip force, shear stress in a width direction, and shear stress in a circumferential direction that are applied to the tire.

In a case where a three-component force sensor measures a grip force, shear stress in a width direction, and shear stress in a circumferential direction applied to the tire in the stress measurement step, a grip force distribution, a shear stress distribution in the width direction, and a shear stress distribution in the circumferential direction can be calculated as tire ground contact characteristics.

The vehicle action simulation method according to one aspect of the present invention may further include: a reflection step of causing a vehicle characteristic measuring portion to control an amount of displacement to be given to a vehicle body of a test vehicle of the vehicle characteristic measuring portion and an amount of displacement to be given to a wheel of the test vehicle while reflecting the behavior of the actual vehicle during travel predicted in the prediction step and the tire ground contact characteristics calculated in the calculation step; and a measurement step of causing the vehicle characteristic measuring portion to measure the amount of displacement and/or an acting force of the vehicle body and the amount of displacement and/or an acting force of the wheel in which the predicted behavior of the actual vehicle during travel and the tire ground contact characteristics are reflected. A support part of a mount portion of the vehicle characteristic measuring portion may independently displace the vehicle body and the wheel, a measuring instrument of the mount portion may measure the amount of displacement and/or the acting force of the vehicle body and the amount of displacement and/or the acting force of the wheel, and a controller provided in the vehicle characteristic measuring portion may control the amount of displacement to be given to the vehicle body by the support part and the amount of displacement to be given to the wheel by the support part. In the reproduction step, the vehicle behavior simulation portion may predict a motion state of the actual vehicle during travel by using measurement data of the measuring instrument and may reproduce the transient change on the tire on the basis of the predicted motion state and the predicted behavior of the actual vehicle during travel.

In a case where the vehicle behavior simulation portion predicts a motion state of the actual vehicle during travel by using the measurement data of the measuring instrument and reproduces the transient change in the tire attitude that occurs during the travel of the actual vehicle on the tire on the basis of the motion state and the behavior of the actual vehicle during travel, unlike in a case where the measurement data of the measuring instrument is not used, a transient change in a tire attitude that occurs during the travel of the actual vehicle, in which, for example, suspension characteristics and the like and the behavior of the actual vehicle during travel are reflected, can be reproduced on the tire and the behavior of the actual vehicle using the actual measured values of a chassis, a suspension, and the like, which are difficult to model, can be predicted with high accuracy.

In the vehicle action simulation method according to one aspect of the present invention, a command based on predicted vehicle characteristics may be transmitted to an electronic control unit of the test vehicle to cause the electronic control unit of the test vehicle to recognize a traveling state.

In a case where the command based on the predicted vehicle characteristics is transmitted to an electronic control unit of the test vehicle to cause the electronic control unit of the test vehicle to recognize a traveling state, it is possible to obtain tire ground contact characteristics with higher accuracy than in a case where the electronic control unit of the test vehicle is not caused to recognize a traveling state, and to simulate the behavior of the actual vehicle on which the tires are mounted during travel with high accuracy.

In the vehicle action simulation method according to one aspect of the present invention, at least one of simulation signals substituting for a rotational speed sensor for a wheel, a yaw rate sensor, a vehicle acceleration sensor, a sensor for acceleration acting on an axis of the tire, a front radar, and a camera may be transmitted as the command that is transmitted to the electronic control unit and is based on the predicted vehicle characteristics.

In a case where at least one of the simulation signals substituting for the rotational speed sensor for the wheel, the yaw rate sensor, the vehicle acceleration sensor, the sensor for acceleration acting on the axis of the tire, the front radar, and the camera is transmitted to the electronic control unit, the behavior of the actual vehicle during travel predicted by the vehicle behavior simulation portion can be made closer to the actual behavior of the actual vehicle during travel than in a case where these simulation signals are not transmitted to the electronic control unit.

A vehicle action simulation system according to one aspect of the present invention includes a tire ground contact characteristic measuring portion and a vehicle behavior simulation portion. The vehicle behavior simulation portion predicts a behavior of an actual vehicle during travel on the basis of input information; the tire ground contact characteristic measuring portion includes a rotatable rotary drum, stress measuring portion that is embedded on the rotary drum and measures stress applied to a tire in contact with the rotary drum, and a processing portion that calculates tire ground contact characteristics on the basis of the stress measured by the stress measuring portion; the tire ground contact characteristic measuring portion changes an attitude of a tire and a rotational speed of a rotary drum to reproduce a transient change in a tire attitude that occurs during the travel of the actual vehicle on the tire while reflecting the behavior of the actual vehicle during travel predicted by the vehicle behavior simulation portion; the processing portion calculates the tire ground contact characteristics corresponding to a tire attitude at each point in time during a period where the transient change occurs; the vehicle behavior simulation portion predicts the behavior of the actual vehicle during travel while reflecting vehicle characteristics that are predicted from the tire ground contact characteristics calculated by the processing portion of the tire ground contact characteristic measuring portion; and the prediction of the behavior of the actual vehicle during travel performed by the vehicle behavior simulation portion, the reproduction of the transient change performed by the tire ground contact characteristic measuring portion, the measurement of stress performed by the stress measuring portion, and the calculation of the tire ground contact characteristics performed by the processing portion are performed in parallel.

That is, in the vehicle action simulation system according to one aspect of the present invention, the vehicle behavior simulation portion predicts the behavior of the actual vehicle during travel while reflecting vehicle characteristics that are predicted from the tire ground contact characteristics calculated by the tire ground contact characteristic measuring portion.

For this reason, according to the vehicle action simulation system of one aspect of the present invention, the behavior of the actual vehicle on which the tires are mounted during travel can be simulated with higher accuracy than in a case where vehicle characteristics predicted from the tire ground contact characteristics are not reflected.

In the vehicle action simulation system according to one aspect of the present invention, the tire ground contact characteristic measuring portion may further include a drum driving portion that rotationally drives the rotary drum, a tire position control portion that controls a position of the tire with respect to the rotary drum, a tire driving portion that rotationally drives the tire, and a tire angle control portion that controls an angle of the tire with respect to the rotary drum, and the drum driving portion, the tire position control portion, the tire driving portion, and the tire angle control portion may operate to reproduce the transient change in the tire attitude that occurs during the travel of the actual vehicle on the tire while reflecting the behavior of the actual vehicle during travel predicted by the vehicle behavior simulation portion.

In a case where the behavior of the actual vehicle during the travel predicted by the vehicle behavior simulation portion is reflected when reproducing a transient change in the tire attitude that occurs during the travel of the actual vehicle on the tire, the transient change in the tire attitude that occurs during the travel of the actual vehicle can be reproduced on the tire more accurately than in a case where the behavior of the actual vehicle during the travel predicted by the vehicle behavior simulation portion is not reflected when reproducing the transient change in the tire attitude that occurs during the travel of the actual vehicle on the tire.

In the vehicle action simulation system according to one aspect of the present invention, the drum driving portion may be capable of adjusting a rotational speed of the rotary drum, the tire position control portion may be capable of adjusting the position of the tire with respect to the rotary drum in a direction of an axis of rotation and/or a radial direction of the rotary drum, the tire driving portion may be capable of adjusting a rotational speed of the tire, and the tire angle control portion may be capable of adjusting a camber angle, a slip angle, and/or a grip force of the tire.

In a case where the rotational speed of the rotary drum can be adjusted, the position of the tire with respect to the rotary drum can be adjusted in the direction of the axis of rotation and/or the radial direction of the rotary drum, the rotational speed of the tire can be adjusted, and the camber angle, the slip angle, and/or the grip force of the tire can be adjusted, a transient change in a tire attitude that occurs during the travel of the actual vehicle can be reproduced on the tire more accurately than in a case where any one of these cannot be adjusted.

In the vehicle action simulation system according to one aspect of the present invention, the stress measuring portion may be a three-component force sensor that can measure a grip force, shear stress in a width direction, and shear stress in a circumferential direction applied to the tire.

In a case where the stress measuring portion is a three-component force sensor, the processing portion can calculate a grip force distribution, a shear stress distribution in the width direction, and a shear stress distribution in the circumferential direction as tire ground contact characteristics.

The vehicle action simulation system according to one aspect of the present invention may further include a vehicle characteristic measuring portion including a test vehicle that includes a vehicle body and a wheel, a mount portion that includes a support part on which the test vehicle is to be placed and a measuring instrument measuring an amount of displacement and/or an acting force of the vehicle body and an amount of displacement and/or an acting force of the wheel, and a controller that controls the amount of displacement to be given to the vehicle body by the support part and the amount of displacement to be given to the wheel by the support part. The support part may independently displace the vehicle body and the wheel, and the vehicle behavior simulation portion may predict a motion state of the actual vehicle during travel by using measurement data of the measuring instrument and may reproduce the transient change on the tire on the basis of the predicted motion state and the predicted behavior of the actual vehicle during travel.

In a case where the vehicle behavior simulation portion predicts a motion state of the actual vehicle during travel by using the measurement data of the measuring instrument and reproduces the transient change in the tire attitude that occurs during the travel of the actual vehicle on the tire on the basis of the motion state and the behavior of the actual vehicle during travel, unlike in a case where the measurement data of the measuring instrument is not used, a transient change in a tire attitude that occurs during the travel of the actual vehicle, in which, for example, suspension characteristics and the like and the behavior of the actual vehicle during travel are reflected, can be reproduced on the tire and the behavior of the actual vehicle using the actual measured values of a chassis, a suspension, and the like, which are difficult to model, can be predicted with high accuracy.

In the vehicle action simulation system according to one aspect of the present invention, a command based on predicted vehicle characteristics may be transmitted to an electronic control unit of the test vehicle to cause the electronic control unit of the test vehicle to recognize a traveling state.

In a case where a command based on the predicted vehicle characteristics is transmitted to the electronic control unit of the test vehicle to cause the electronic control unit of the test vehicle to recognize a traveling state, it is possible to obtain tire ground contact characteristics with higher accuracy than in a case where the electronic control unit of the test vehicle is not caused to recognize a traveling state, and to simulate the behavior of the actual vehicle on which the tires are mounted during travel with high accuracy.

In the vehicle action simulation system according to one aspect of the present invention, at least one of simulation signals substituting for a rotational speed sensor for a wheel, a yaw rate sensor, a vehicle acceleration sensor, a sensor for acceleration acting on an axis of the tire, a front radar, and a camera may be transmitted as the command that is transmitted to the electronic control unit and is based on the predicted vehicle characteristics.

In a case where at least one of simulation signals substituting for the rotational speed sensor for the wheel, the yaw rate sensor, the vehicle acceleration sensor, the sensor for acceleration acting on the axis of the tire, the front radar, and the camera is transmitted to the electronic control unit, the behavior of the actual vehicle during travel predicted by the vehicle behavior simulation portion can be made closer to the actual behavior of the actual vehicle during travel than in a case where these simulation signals are not transmitted to the electronic control unit.

In the present invention, the ground contact characteristics of the tire are measured values obtained from the sensors, various stresses calculated from the measured values, wear energy, slippage, and the like, and include a grip force distribution, various stress distributions, a slip distribution, and the like.

The motion state and the vehicle characteristics can include various parameters represented by the position of a vehicle, a steering angle, moments around a pitch axis, a roll axis, and a yaw axis, the speed of a vehicle, the inertia parameter of a vehicle, a grip force, the axial force of a tire, and the like; and the axial force of a tire can include at least six component forces acting on the axis of rotation of a tire. The six component forces are forces that act on the fixed axis of a tire in an X-axis direction, a Y-axis direction, and a Z-axis direction, a moment acting around an X axis, a moment acting around a Y axis, and a moment acting around a Z axis.

Further, the command transmitted to the electronic control unit and based on the predicted vehicle characteristics includes a wheel speed, a yaw rate, vehicle acceleration, acceleration acting on an axis of a tire, and simulation signals substituting for various sensors mounted on a vehicle, such as a front radar and a camera.

In addition, the components of the above-mentioned embodiments can be appropriately replaced with well-known components without departing from the scope of the present invention, and the above-mentioned embodiments and the respective examples may be appropriately combined.

INDUSTRIAL APPLICABILITY

In a case where the vehicle action simulation method according to the present invention is applied in a relevant field, the behavior of an actual vehicle on which tires are mounted during travel can be simulated with high accuracy.

REFERENCE SIGNS LIST

100: Tire ground contact characteristic measuring portion
1: Rotary drum
2: Drum driving portion
2A: Drum shaft
3: Stress measuring portion
4: Processing portion
5: Tire position control portion
5A: Spindle shaft
6: Tire driving portion
7: Tire angle control portion
8: Drum-side rotational position detecting portion
9: Tire-side rotational position detecting portion
10: Tire pressure changing portion
T: Tire
T1: Tread surface
T1A: Ground contact region
200: Vehicle characteristic measuring portion
201: Test vehicle
202: Wheel
203: Vehicle body
205: Steering wheel
210: Mount portion
214: Support part
215: Measuring instrument
220: Controller
300: Vehicle behavior simulation portion
400: Vehicle action simulation system

The invention claimed is:

1. A vehicle action simulation method comprising:
changing an attitude of a tire and a rotational speed of a rotary drum to reproduce a transient change in a tire attitude that occurs during travel of an actual vehicle on the tire in accordance with the behavior of the actual vehicle travel based on input information before a predicted behavior has been determined and based on the predicted behavior thereafter;
measuring a stress that is applied to the tire in contact with the rotary drum that is rotationally driven by a stress measuring portion, which is embedded on the rotatable rotary drum; and
calculating the tire ground contact characteristics on the basis of the measured stress,
wherein the calculated tire ground contact characteristics correspond to a tire attitude at each point in time during a period where the transient change occurs,
and predicting the behavior of the actual vehicle during travel based on vehicle characteristics predicted from the calculated tire ground contact characteristics,
wherein predicting the behavior of the actual vehicle during travel, changing the attitude of the tire and the rotational speed of the rotary drum, the measuring the stress that is applied to the tire, and calculating the tire ground contact characteristics on the basis of the measured stress are performed in parallel.

2. The vehicle action simulation method according to claim 1,
changing the attitude of the tire and the rotational speed of the rotary drum further comprises
adjusting the rotational speed of the rotary drum by a drum driving portion of the tire ground contact characteristic measuring portion,
adjusting a position of the tire with respect to the rotary drum in a direction of an axis of rotation and/or a radial direction of the rotary drum,
adjusting a rotational speed of the tire,
adjusting a camber angle, a slip angle, and/or a grip force of the tire.

3. The vehicle action simulation method according to claim 2,
wherein, when measuring a stress that is applied to the tire in contact with the rotary drum, a three-component force sensor serving as the stress measuring portion measures a grip force, shear stress in a width direction, and shear stress in a circumferential direction that are applied to the tire.

4. The vehicle action simulation method according to claim 2, further comprising:
controlling an amount of displacement to be given to a vehicle body of a test vehicle and an amount of displacement to be given to a wheel of the test vehicle in accordance with the predicted behavior of the actual vehicle during travel and the calculated tire ground contact characteristics;
measuring the amount of displacement and/or an acting force of the vehicle body and the amount of displacement and/or an acting force of the wheel in accordance with the predicted behavior of the actual vehicle during travel and the tire ground contact characteristics,
wherein a support part of a mount portion independently displaces the vehicle body and the wheel,
measuring the amount of displacement and/or the acting force of the vehicle body and the amount of displacement and/or the acting force of the wheel, and
controlling the amount of displacement to be given to the vehicle body by the support part and the amount of displacement to be given to the wheel by the support part,
wherein changing the attitude of the tire and the rotational speed of the rotary drum includes predicting a motion state of the actual vehicle during travel by using measurement data and reproducing the transient change on the tire on the basis of the predicted motion state and the predicted behavior of the actual vehicle during travel.

5. The vehicle action simulation method according to claim 4,
wherein a command based on predicted vehicle characteristics is transmitted to an electronic control unit of the test vehicle to cause the electronic control unit of the test vehicle to recognize a traveling state.

6. The vehicle action simulation method according to claim 5,
wherein at least one of simulation signals substituting for a rotational speed sensor for a wheel, a yaw rate sensor, a vehicle acceleration sensor, a sensor for acceleration acting on an axis of the tire, a front radar, and a camera is transmitted as the command that is transmitted to the electronic control unit and is based on the predicted vehicle characteristics.

7. The vehicle action simulation method according to claim 3, further comprising:
controlling an amount of displacement to be given to a vehicle body of a test vehicle and an amount of displacement to be given to a wheel of the test vehicle in accordance with the predicted behavior of the actual vehicle during travel and the calculated tire ground contact characteristics; and measuring the amount of displacement and/or an acting force of the vehicle body and the amount of displacement and/or an acting force of the wheel in which the predicted behavior of the actual vehicle during travel and the tire ground contact characteristics are reflected, wherein a support part of a mount portion independently displaces the vehicle body and the wheel, measuring the amount of displacement and/or the acting force of the vehicle body and the amount of displacement and/or the acting force of the wheel, and controlling the amount of displacement to be given to the vehicle body by the support part and the amount of displacement to be given to the wheel by the support part, wherein changing the attitude of the tire and the rotational speed of the rotary drum incudes predicting a motion state of the actual vehicle during travel by using measurement data and reproducing the transient change on the tire on the basis of the predicted motion state and the predicted behavior of the actual vehicle during travel.

8. The vehicle action simulation method according to claim 7, wherein a command based on predicted vehicle characteristics is transmitted to an electronic control unit of the test vehicle to cause the electronic control unit of the test vehicle to recognize a traveling state.

9. The vehicle action simulation method according to claim 8, wherein at least one of simulation signals substituting for a rotational speed sensor for a wheel, a yaw rate sensor, a vehicle acceleration sensor, a sensor for acceleration acting on an axis of the tire, a front radar, and a camera is transmitted as the command that is transmitted to the electronic control unit and is based on the predicted vehicle characteristics.

10. A vehicle action simulation system comprising:
a tire ground contact characteristic measuring portion; and
a vehicle behavior simulator,
the tire ground contact characteristic measuring portion includes:
a rotatable rotary drum,
a stress measurer that is embedded on the rotary drum and measures stress applied to a tire in contact with the rotary drum, and
a processor that calculates tire ground contact characteristics on the basis of the stress measured by the stress measurer,
the tire ground contact characteristic measuring portion changes an attitude of a tire and a rotational speed of a rotary drum to reproduce a transient change in a tire attitude that occurs during travel of the actual vehicle on the tire based on input information before a predicted behavior has been determined and based on the predicted behavior thereafter,
the processor calculates the tire ground contact characteristics corresponding to a tire attitude at each point in time during a period where the transient change occurs,
the vehicle behavior simulator predicts the behavior of the actual vehicle during travel based on vehicle characteristics that are predicted from the tire ground contact characteristics calculated by the processor of the tire ground contact characteristic measuring portion, and
the prediction of the behavior of the actual vehicle during travel performed by the vehicle behavior simulator, the reproduction of the transient change performed by the tire ground contact characteristic measuring portion, the measurement of stress performed by the stress measurer, and the calculation of the tire ground contact characteristics performed by the processor are performed in parallel.

11. The vehicle action simulation system according to claim 10, wherein the tire ground contact characteristic measuring portion further includes:
a drum driver that rotationally drives the rotary drum;
a tire position controller that control a position of the tire with respect to the rotary drum,
a tire driver that rotationally drives the tire; and
a tire angle controller that controls an angle of the tire with respect to the rotary drum, and
the drum driver, the tire position controller, the tire driver, and the tire angle controller operate to reproduce the transient change in the tire attitude that occurs during travel of the actual vehicle on the tire in accordance with the behavior of the actual vehicle during travel predicted by the vehicle behavior simulator.

12. The vehicle action simulation system according to claim 11, wherein the drum driver can adjust a rotational speed of the rotary drum,
the tire position controller can adjust the position of the tire with respect to the rotary drum in a direction of an axis of rotation and/or a radial direction of the rotary drum,
the tire driver can adjust a rotational speed of the tire, and
the tire angle controller can adjust a camber angle, a slip angle, and/or a grip force of the tire.

13. The vehicle action simulation system according to claim 12, wherein the stress measurer is a three-component force sensor that measures a grip force, shear stress in a width direction, and shear stress in a circumferential direction applied to the tire.

14. The vehicle action simulation system according to claim 12, further comprising:
a vehicle characteristic measurer including:
a test vehicle that includes a vehicle body and a wheel;
a mount that includes a supporter on which the test vehicle is to be placed and a measurer that measures an amount of displacement and/or an acting force of the vehicle body and an amount of displacement and/or an acting force of the wheel, and
a controller that controls the amount of displacement to be given to the vehicle body by the supporter and the amount of displacement to be given to the wheel by the supporter,
wherein the supporter independently displaces the vehicle body and the wheel, and
the vehicle behavior simulator predicts a motion state of the actual vehicle during travel by using measurement data of the measurer and reproduces the transient change on the tire on the basis of the predicted motion state and the predicted behavior of the actual vehicle during travel.

15. The vehicle action simulation system according to claim 13, further comprising:
a vehicle characteristic measurer including:
a test vehicle that includes a vehicle body and a wheel;
a mount that includes a supporter on which the test vehicle is to be placed and a measurer that measures an amount of displacement and/or an acting force of the vehicle body and an amount of displacement and/or an acting force of the wheel, and a controller that controls the amount of displacement to be given to the vehicle body by the supporter and the amount of displacement to be given to the wheel by the supporter, wherein the supporter independently displaces the vehicle body and the wheel, and the vehicle behavior simulator predicts a motion state of the actual vehicle during travel by using measurement data of the measurer and reproduces the transient change on the tire on the basis of the predicted motion state and the predicted behavior of the actual vehicle during travel.

16. The vehicle action simulation system according to claim 11, wherein the stress measurer is a three-component force sensor that measures a grip force, shear stress in a width direction, and shear stress in a circumferential direction applied to the tire.

17. The vehicle action simulation system according to claim 16, further comprising:

a vehicle characteristic measurer including:

a test vehicle that includes a vehicle body and a wheel;

a mount that includes a supporter on which the test vehicle is to be placed and a measurer that measures an amount of displacement and/or an acting force of the vehicle body and an amount of displacement and/or an acting force of the wheel, and a controller that controls the amount of displacement to be given to the vehicle body by the supporter and the amount of displacement to be given to the wheel by the supporter, wherein the supporter independently displaces the vehicle body and the wheel, and the vehicle behavior simulator predicts a motion state of the actual vehicle during travel by using measurement data of the measurer and reproduces the transient change on the tire on the basis of the predicted motion state and the predicted behavior of the actual vehicle during travel.

18. The vehicle action simulation system according to claim 11, further comprising:

a vehicle characteristic measurer including:

a test vehicle that includes a vehicle body and a wheel;

a mount that includes a supporter on which the test vehicle is to be placed and a measurer that measures an amount of displacement and/or an acting force of the vehicle body and an amount of displacement and/or an acting force of the wheel, and a controller that controls the amount of displacement to be given to the vehicle body by the supporter and the amount of displacement to be given to the wheel by the supporter, wherein the supporter independently displaces the vehicle body and the wheel, and the vehicle behavior simulator predicts a motion state of the actual vehicle during travel by using measurement data of the measurer and reproduces the transient change on the tire on the basis of the predicted motion state and the predicted behavior of the actual vehicle during travel.

19. The vehicle action simulation system according to claim 18, wherein a command based on predicted vehicle characteristics is transmitted to an electronic control unit of the test vehicle to cause the electronic control unit of the test vehicle to recognize a traveling state.

20. The vehicle action simulation system according to claim 19, wherein at least one of simulation signals substituting for a rotational speed sensor for a wheel, a yaw rate sensor, a vehicle acceleration sensor, a sensor for acceleration acting on an axis of the tire, a front radar, and a camera is transmitted as the command that is transmitted to the electronic control unit and is based on the predicted vehicle characteristics.

\* \* \* \* \*